US010494962B2

(12) United States Patent
Yuki et al.

(10) Patent No.: US 10,494,962 B2
(45) Date of Patent: Dec. 3, 2019

(54) OIL STRAINER

(71) Applicant: DaikyoNishikawa Corporation, Hiroshima (JP)

(72) Inventors: Atsushi Yuki, Hiroshima (JP); Kengo Takatsugi, Hiroshima (JP)

(73) Assignee: DaikyoNishikawa Corporation, Hiroshima (JP)

(*) Notice: Subject to any disclaimer, the term of this patent is extended or adjusted under 35 U.S.C. 154(b) by 750 days.

(21) Appl. No.: 14/427,513

(22) PCT Filed: Sep. 10, 2013

(86) PCT No.: PCT/JP2013/005350
§ 371 (c)(1),
(2) Date: Mar. 11, 2015

(87) PCT Pub. No.: WO2014/045545
PCT Pub. Date: Mar. 27, 2014

(65) Prior Publication Data
US 2015/0247431 A1 Sep. 3, 2015

(30) Foreign Application Priority Data

Sep. 18, 2012 (JP) .................... 2012-204556
Feb. 21, 2013 (JP) .................... 2013-032244

(51) Int. Cl.
F01M 1/10 (2006.01)
B01D 35/02 (2006.01)
B01D 29/01 (2006.01)
B01D 35/30 (2006.01)
F01M 11/00 (2006.01)
(Continued)

(52) U.S. Cl.
CPC .............. F01M 1/10 (2013.01); B01D 29/01 (2013.01); B01D 35/02 (2013.01); B01D 35/0273 (2013.01); B01D 35/30 (2013.01); F16H 57/0404 (2013.01); F01M 2001/1028 (2013.01);
(Continued)

(58) Field of Classification Search
CPC ............. F01M 1/10; F01M 2001/1028; F01M 2011/007; F01M 2001/1078; B01D 35/30; B01D 35/02; B01D 35/0273; B01D 29/01; F16H 57/0404
See application file for complete search history.

(56) References Cited

U.S. PATENT DOCUMENTS

2005/0133428 A1* 6/2005 Peet .................. B01D 35/0273
210/232
2008/0156412 A1* 7/2008 Enokida .................. B29C 65/06
156/73.6
2010/0162988 A1* 7/2010 Enokida ............. F01M 11/0004
123/195 C

FOREIGN PATENT DOCUMENTS

JP H08-121138 A 5/1996
JP 2004-353783 A 12/2004
(Continued)

OTHER PUBLICATIONS

International Search Report; PCT/JP2013/005350; dated Nov. 12, 2013.

Primary Examiner — Lucas A Stelling
Assistant Examiner — Angel Olivera
(74) Attorney, Agent, or Firm — Studebaker & Brackett PC

(57) ABSTRACT

A casing (20) housing a filter (10) includes a sealing portion (43) for sealing a gap between an upstream space (R1) and a downstream space (R2). The sealing portion (43) has a bridge shape separated from a wall surface of the oil channel and extending across the channel.

3 Claims, 21 Drawing Sheets

(51) Int. Cl.
*F16H 57/04* (2010.01)
*B01D 35/027* (2006.01)
(52) U.S. Cl.
CPC .............. *F01M 2001/1078* (2013.01); *F01M 2011/007* (2013.01)

(56) References Cited

FOREIGN PATENT DOCUMENTS

| | | |
|---|---|---|
| JP | 2008-115969 A | 5/2008 |
| JP | 2012-127221 A | 7/2012 |

* cited by examiner

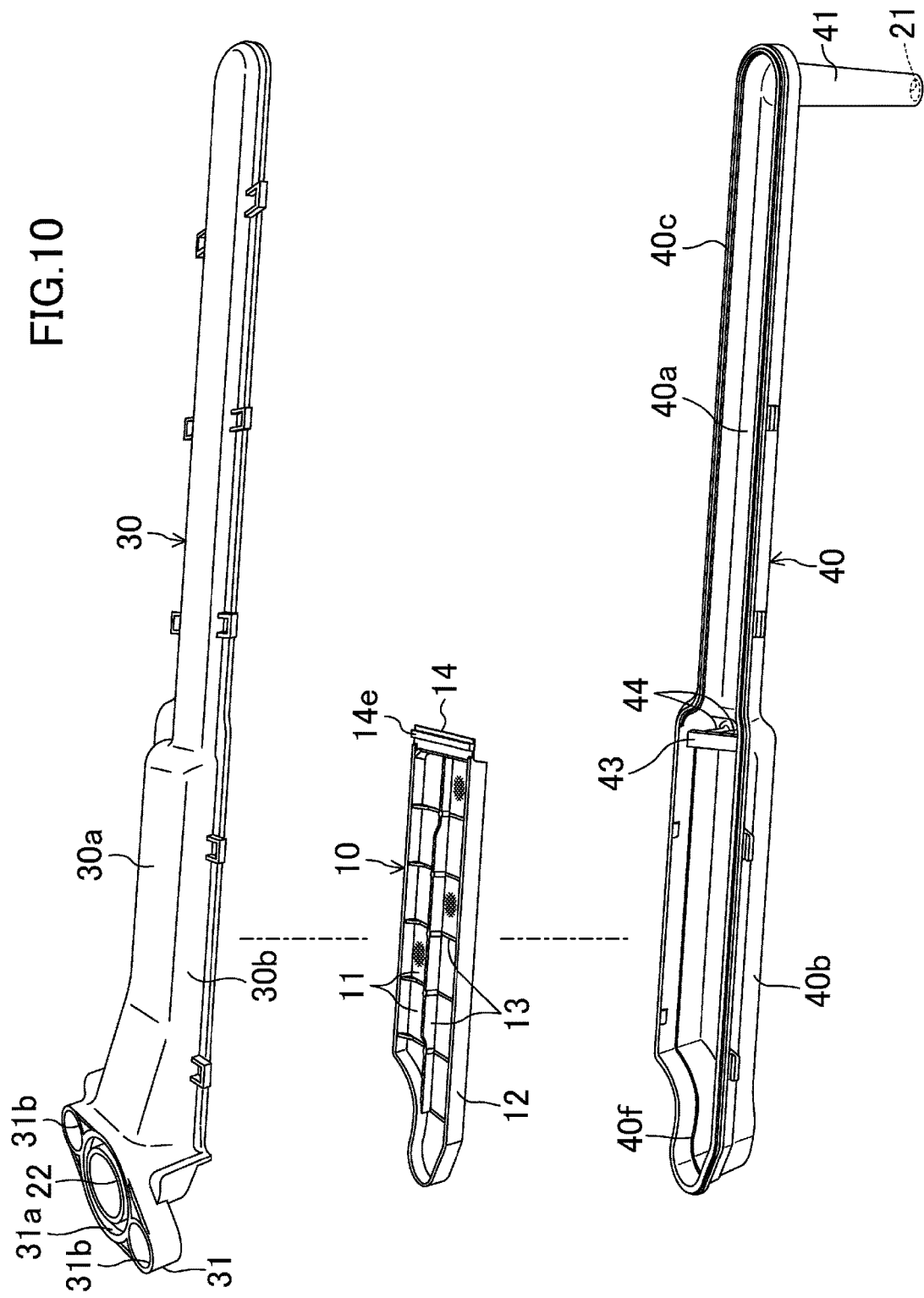

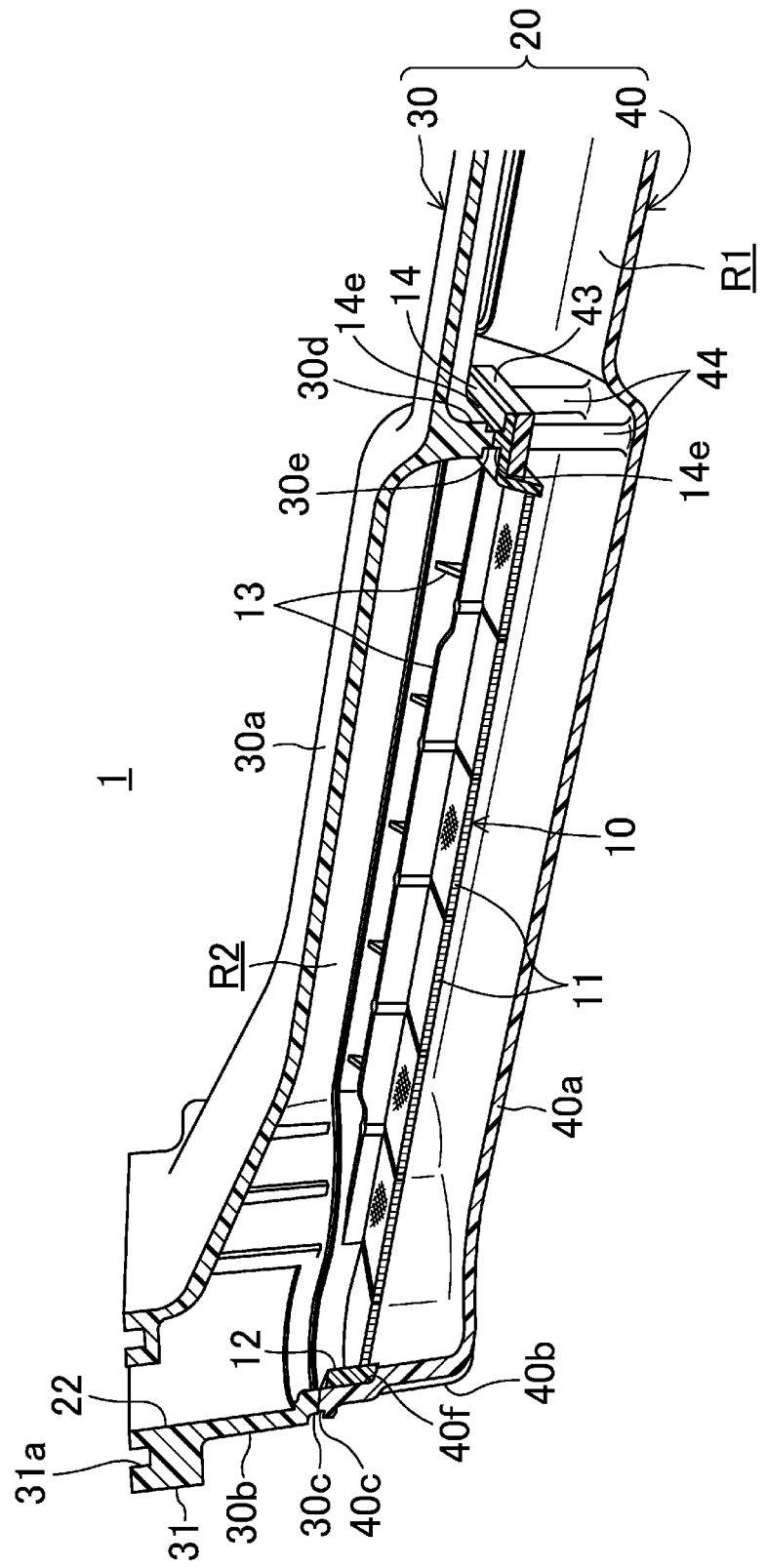

OIL STRAINER

TECHNICAL FIELD

The present invention relates to oil strainers for filtering oil.

BACKGROUND ART

A typical oil strainer used for, for example, an engine of a vehicle includes a filter for filtering oil and a casing housing the filter. The casing is divided into an upper member and a lower member, and these members are welded into one unit with the filter being housed in one of the members (see, for example, Patent Document 1).

In Patent Document 1, the filter is housed in the upper member, and oil sucked through an oil suction port in the lower member is filtered by the filter. Then, the oil is caused to flow out of the casing through an oil outlet in the upper member, and is supplied to an oil pump. The filter has a frame that is supported from below by a projection projecting upward from the inner surface of the lower member.

CITATION LIST

Patent Document

[Patent Document 1] Japanese Unexamined Patent Publication No. 2012-127221

SUMMARY OF THE INVENTION

Technical Problem

An oil strainer housing a filter as described in Patent Document 1 needs to be sealed without fails so as to prevent oil leakage between a space upstream of the filter and a space downstream of the filter with regard to an oil flow direction. This is because a downstream flow of unfiltered oil leaking from a portion except the filter can deteriorate filtration performance.

It is therefore a first object of the present invention to enhance filtration performance by preventing unfiltered oil upstream of an oil filter from leaking toward a downstream portion without filtration.

In some cases, the entire peripheral portion of the filter can be fitted in the upper member or the lower member as in Patent Document 1. In other cases, however, the entire peripheral portion of the filter cannot be fitted in the upper member or the lower member, depending on the location of the divided planes of the casing or a channel design in the casing. In such cases, even if part of the peripheral portion of the filter that is not fitted in any of the upper member or the lower member is supported by the projection projecting from one of the members, a clearance is likely to be formed between the other member and the periphery of the filter, and consequently, unfiltered oil might pass through the clearance, resulting in leakage of foreign matter from the oil outlet.

It is a second object of the present invention to reduce a filtration failure by preventing formation of a clearance between the periphery of a filter and an inner surface of a casing in disposing the filter such that at least one end of the filter is located at an intermediate portion in the longitudinal direction in of cylindrical casing.

Solution to the Problem

To achieve the first object, a sealing portion having a bridge shape is used to seal a gap between an upstream space and a downstream space with regard to an oil flow in a casing.

In a first aspect of the present invention, an oil strainer includes: a filter configured to filter oil; and a casing housing the filter and including an oil inlet and an oil outlet, wherein oil that has flowed into the casing through the oil inlet is filtered by the filter and flows out of the oil outlet, the casing includes a combination of a first section and a second section, the casing has an upstream space located upstream of the filter with regard to an oil flow and a downstream space located downstream of the filter with regard to the oil flow, and the first section of the casing includes a sealing portion sealing a gap between the upstream space and the downstream space, being separated from an inner wall surface of the casing, and having a bridge shape extending across an oil channel.

In this configuration, a gap between the upstream space and the downstream space of the casing is sealed by the sealing portion. The sealing portion, having a bridge shape extending across an oil channel, can seal a range wider than that sealed by a portion supporting a filter in points as described in Patent Document 1. As a result, sealing performance can be enhanced. In addition, since the sealing portion is separated from the inner wall surface of the casing, a sufficient degree of oil distribution can be obtained.

In a second aspect, in the oil strainer of the first aspect, the sealing portion of the first section is welded to the second section.

This configuration ensures sealing of a gap between the upstream space and the downstream space by the sealing portion. In addition, the first section and the second section can be more firmly united.

In a third aspect, in the oil strainer of the first aspect, the filter includes an intervening part between the first section and the second section, and the sealing portion of the first section is in contact with the intervening part.

In this configuration, the intervening part of the filter is held between the sealing portion of the first section and the second section, and thus, the filter can be positioned stably at a predetermined location in the casing.

In a fourth aspect, in the oil strainer of the first aspect, the filter includes a mesh part configured to filter oil and a frame surrounding the mesh part, and the frame is sandwiched between the sealing portion of the first section and the second section.

In this configuration, the frame of the filter is held between the sealing portion of the first section and the second section, and thus, the filter can be positioned stably at a predetermined location in the casing.

In a fifth aspect, the oil strainer of any one of the first through fourth aspects, the first section includes a support supporting the sealing portion.

In this configuration, deformation of the sealing portion can be reduced even after a long-term use of the oil strainer.

To achieve the second, in a sixth aspect, an oil strainer includes: a filter configured to filter oil; and a cylindrical casing housing the filter and including an oil inlet and an oil outlet, wherein oil that has flowed into the casing through the oil inlet is filtered while passing through the filter and flows out of the oil outlet, the casing includes a first section and a second section that are separated from each other along a direction intersecting with a longitudinal direction of the casing, the filter is positioned such that at least one end of the filter is located at an intermediate portion in the longitudinal direction of the casing, the first section includes a contact portion that is in contact with an end of the filter corresponding to the intermediate portion in the longitudinal direction of the casing and is continuous to an outer periphery of the first section, a fitting part in which the filter is fitted is located on an outer periphery of the second section and at least at the intermediate portion in the longitudinal direction of the casing, and the second section includes a support supporting the end of the filter corresponding to the intermediate portion in the longitudinal direction of the casing from a side opposite to the contact portion.

In this configuration, the filter is disposed at least at the intermediate portion in the longitudinal direction of the casing, and the contact portion of the first section is in contact with the end of the filter corresponding to the intermediate portion in the longitudinal direction of the casing. On the other hand, the end of the filter corresponding to the intermediate portion in the longitudinal direction of the casing is supported by the support of the second section from the side opposite to the contact portion. Thus, the end of the filter corresponding to the intermediate portion in the longitudinal direction of the casing can be pushed against the contact portion. Since the contact portion is continuous to the outer periphery of the first section, no clearance is formed between the periphery of the filter and the first section, thereby avoiding passage of unfiltered oil between the periphery of the filter and the first section.

In a seventh aspect, in the oil strainer of the sixth aspect, the support includes a plurality of supports on an inner surface of the second section, and the supports are spaced apart from one another along a lateral direction of an oil channel.

In this configuration, a plurality of portions of the end of the filter corresponding to the intermediate portion in the longitudinal direction of the casing are supported by the supports, thereby ensuring removal of the clearance between the periphery of the filter and the first section. Since there are gaps between the supports and oil can be distributed therethrough, an increase in distribution resistance caused by the presence of the supports can be reduced.

Advantages of the Invention

In the first aspect, the sealing portion sealing a gap between the upstream space and the downstream space in the casing is separated from the inner wall surface of the casing and has a bridge shape, thereby ensuring sealing of a wide range between the upstream space and the downstream space by avoiding inhibition of an oil flow. Thus, unfiltered oil upstream of the filter does not leak toward a downstream portion without filtration, and thus, filtration performance can be enhanced.

In the second aspect, the sealing portion of the first section is welded to the second section. Thus, performance of sealing between the upstream space and the downstream space can be further enhanced, and the first section and the second section can be more firmly united.

In the third aspect, the intervening part of the filter can be held between the sealing portion of the first section and the second section. Thus, the filter can be positioned stably at a predetermined location in the casing.

In the fourth aspect, the frame of the filter can be held between the sealing portion of the first section and the second section. Thus, the filter can be positioned stably at a predetermined location in the casing.

In the fifth aspect, the support supporting the sealing portion can reduce deformation of the sealing portion even after a long-term use, and thus, sealing performance can be obtained.

In the sixth aspect, the contact portion is formed in the first section to be in contact with the end of the filter corresponding to the intermediate portion in the longitudinal direction of the casing. The contact portion is continuous to the outer periphery of the first section. The support supporting the end of the filter corresponding to the intermediate portion in the longitudinal direction of the casing is formed in the second section. In this manner, in the case of disposing the filter at least at the intermediate portion in the longitudinal direction of the casing, formation of a clearance between the periphery of the filter and the inner surface of the casing can be prevented, thereby reducing a filtration failure.

In the seventh aspect, the multiple supports can ensure elimination of a clearance between the periphery of the filter and the first section. Since the supports are spaced apart from each other along the lateral direction of the oil channel, an increase in distribution resistance of oil can be reduced.

BRIEF DESCRIPTION OF THE DRAWINGS

FIG. 10 is a disassembled perspective view illustrating an oil strainer according to a second embodiment.

FIG. 11 is a cross-sectional view of the oil strainer of the second embodiment.

FIG. 23A is a perspective view of the filter when viewed from above, and FIG. 23B is a perspective view of the filter when viewed from below.

FIG. 24A is a perspective view of the filter when viewed from above, FIG. 24B is a perspective view of the filter when viewed from below.

DESCRIPTION OF EMBODIMENTS

Embodiments of the present invention will be described with reference to the drawings. The following embodiments are merely preferred examples in nature, and are not intended to limit the scope, applications, and use of the invention.

First Embodiment

Figure 1:
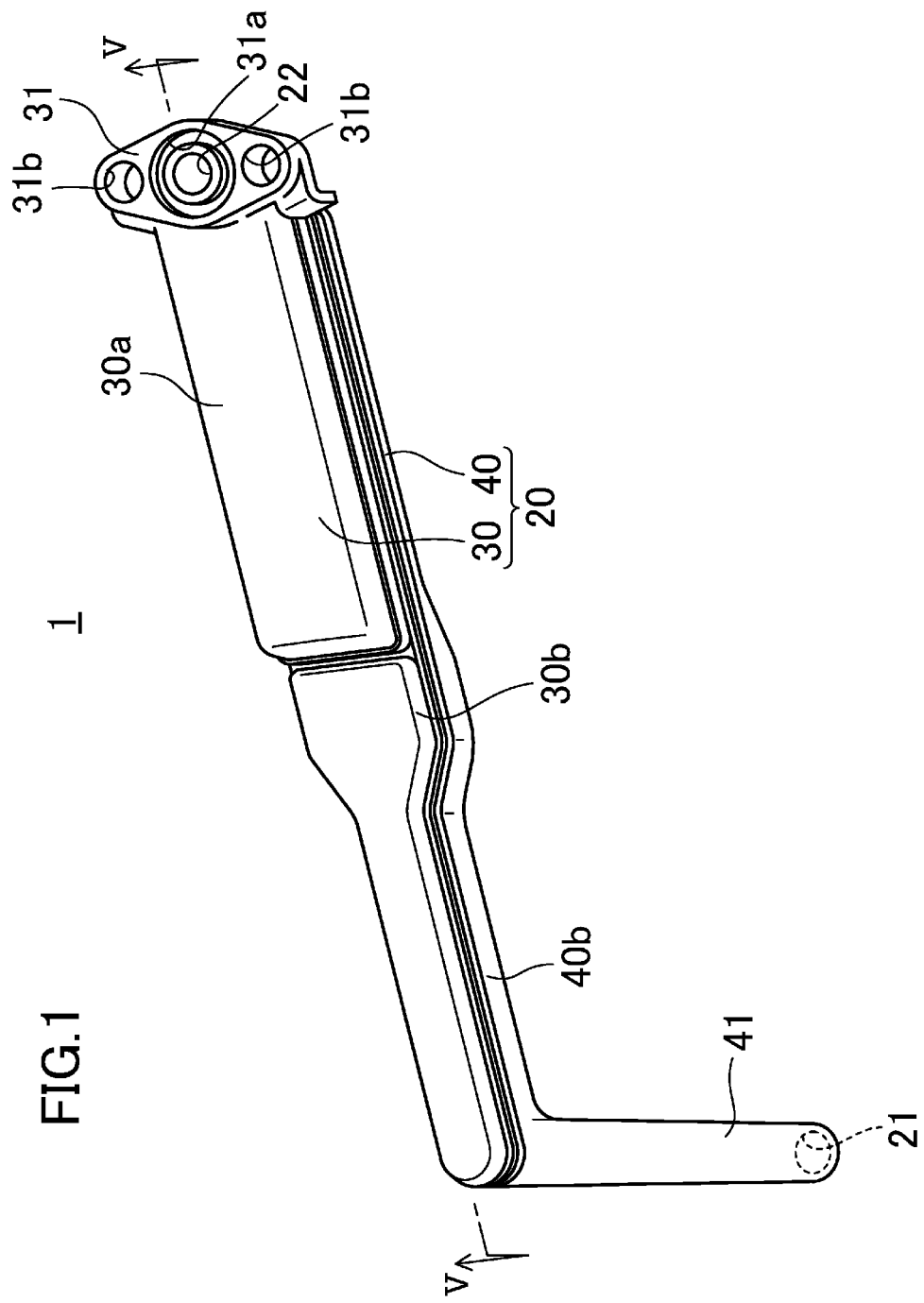
FIG. 1 is a perspective view illustrating an oil strainer according to a first embodiment.

FIG. 1 is a perspective view illustrating an oil strainer 1 according to a first embodiment of the present invention. Although not shown, the oil strainer 1 is disposed in an oil pan of an engine installed in an automobile so as to filter oil circulating in the engine. The oil strainer 1 may be disposed in an oil pan of an automatic transmission, for example.

Figure 2:
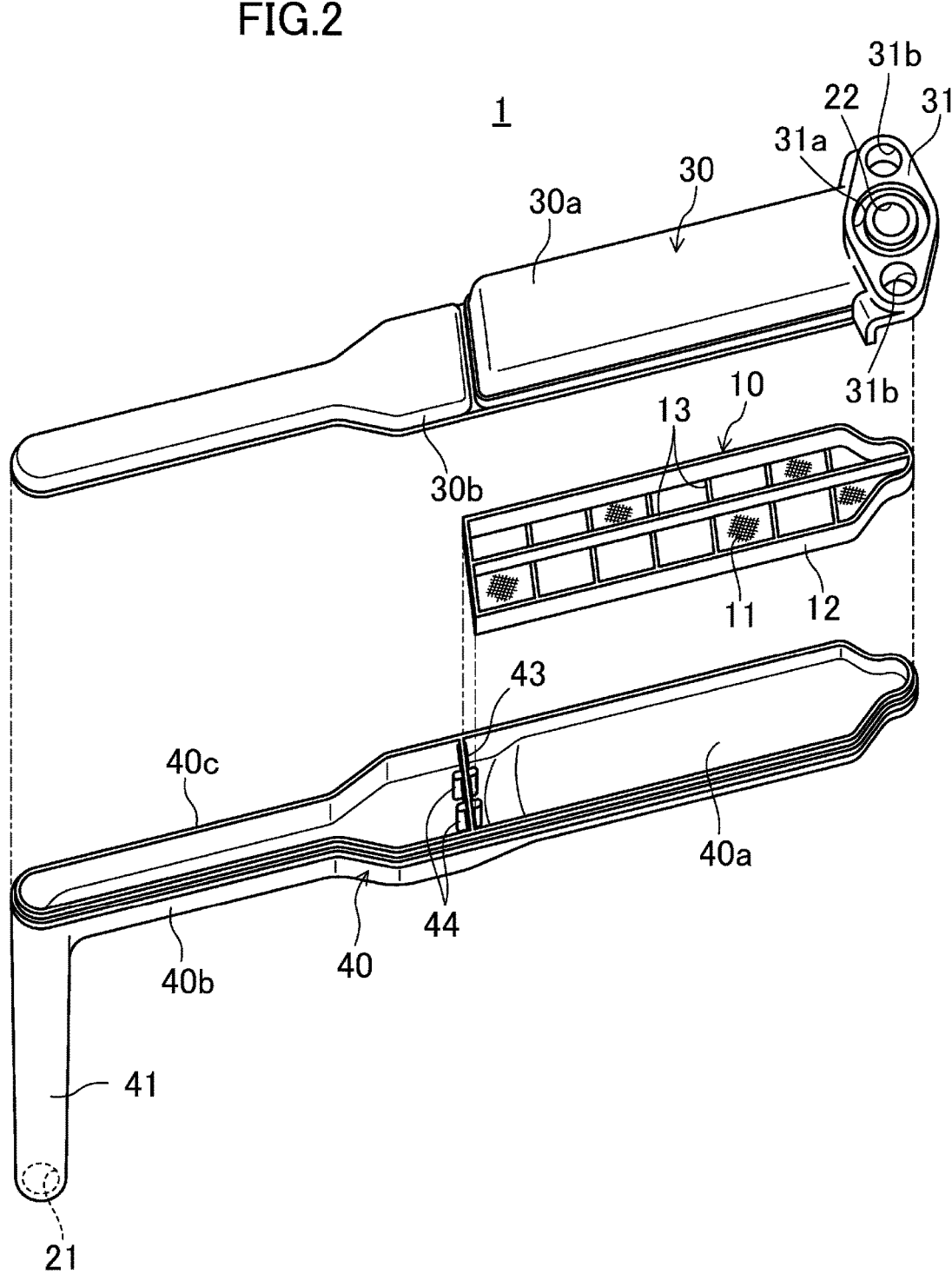
FIG. 2 is a disassembled perspective view of the oil strainer of the first embodiment.

As illustrated in FIG. 2, the oil strainer 1 includes a filter 10 for filtering oil and a casing 20 housing the filter 10.

The casing 20 has a slender cylindrical shape as a whole, and has an oil inlet 21 at one end in the longitudinal direction (i.e., at the left in FIG. 1) and an oil outlet 22 at the other end in the longitudinal direction (i.e., at the right in FIG. 1). Oil sucked into the casing 20 through the oil inlet 21 is filtered by the filter 10 while flowing toward the other end in the longitudinal direction, and flows out through the oil outlet 22. In this embodiment, an upstream part with regard to an oil flow direction refers to a part where the oil inlet 21 is formed, and a downstream part with regard to the oil flow direction refers to a part where the oil outlet 22 is formed.

The oil inlet 21 is located near the bottom wall of the oil pan of the engine. The oil outlet 22 is connected to a suction port of the oil pump of the engine. Since the casing 20 is slender and the oil inlet 21 and the oil outlet 22 are individually disposed at the ends of the casing 20, even in a case where an oil suction part in the oil pan is horizontally separated from the suction port of the oil pump, oil can be filtered while being transferred by using an interior space of the casing 20 as an oil channel.

The casing 20 includes a combination of an upper member 30 constituting an approximately upper half of the casing 20 and a lower member 40 constituting an approximately lower half of the casing 20. The upper member 30 includes an upper wall 30a and a peripheral wall 30b extending downward from the periphery of the upper wall 30a, forms a downwardly recessed shape as a whole, and is elongated along the oil flow direction. The downstream part with regard to the oil flow direction of the upper member 30 is wider than the upstream part thereof.

Figure 4:
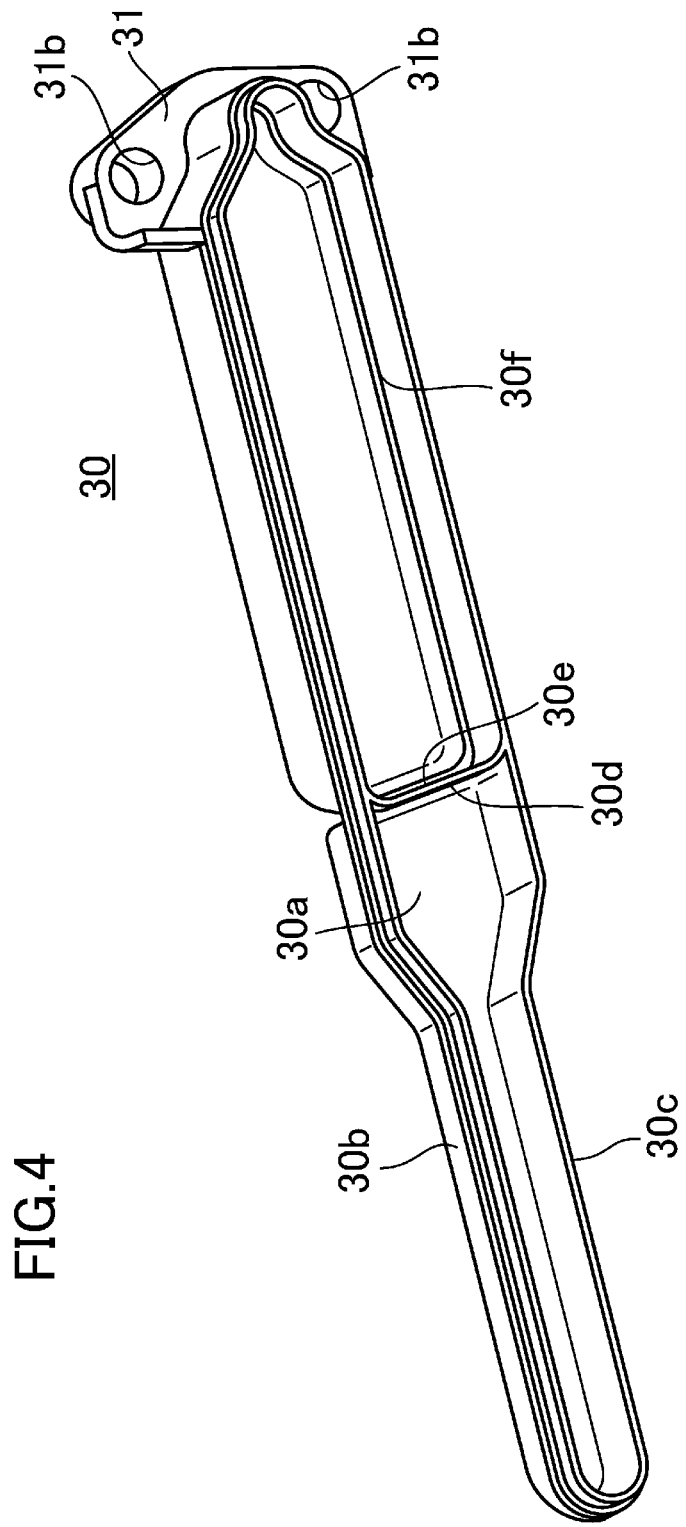
FIG. 4 is a perspective view of an upper member when viewed from below.
Figure 5:
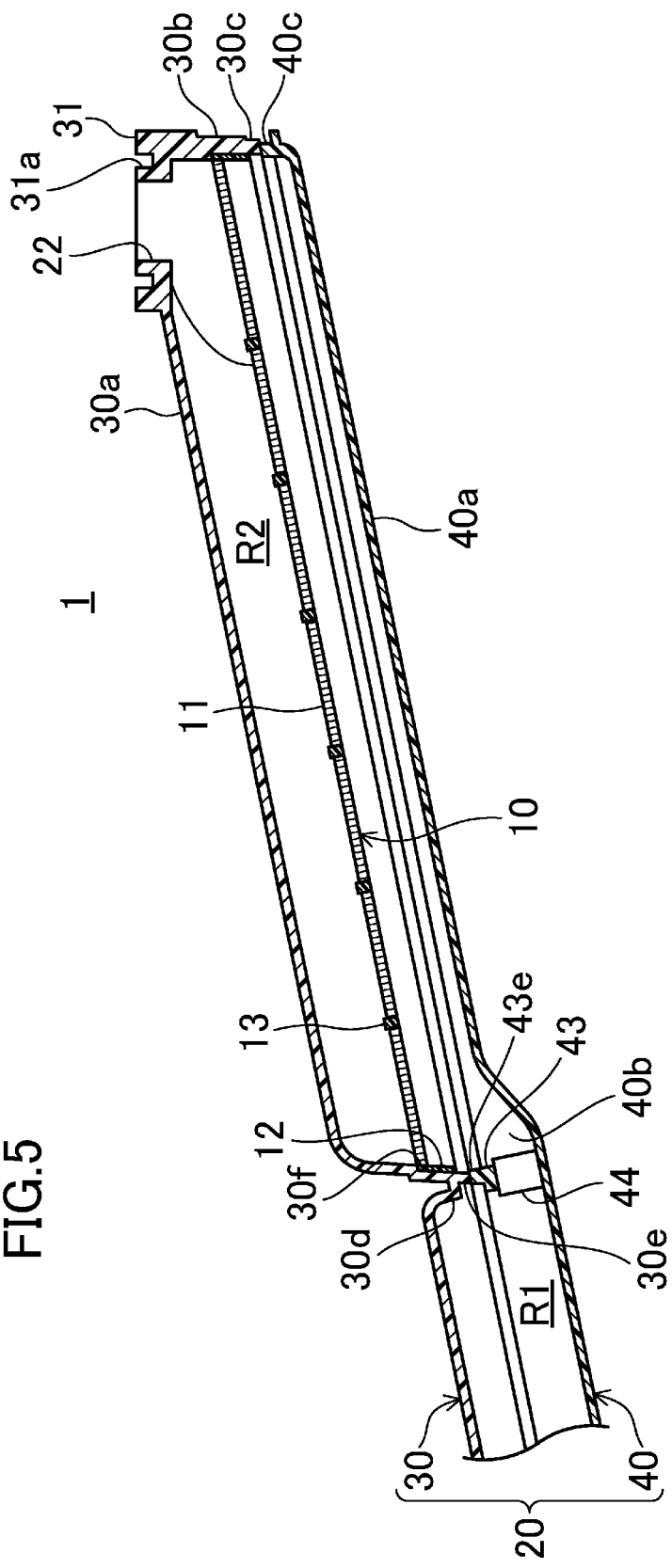
FIG. 5 is a cross-sectional view taken along line V-V in FIG. 1.

As illustrated in FIGS. 4 and 5, an upper welding projection 30c to be welded to the lower member 40 downwardly projects from the lower end of the peripheral wall 30b. The upper welding projection 30c extends along the entire circumference of the peripheral wall 30b.

The upper wall 30a of the upper member 30 has a partition part 30d at a midpoint with regard to the oil flow direction. The partition part 30d partitions the interior space of the casing 20 into an upstream part and a downstream part in the oil flow direction so that an upstream space R1 and a downstream space R2 (both shown in FIG. 5) are formed in the casing 20. The upstream space R1 and the downstream space R2 serve as oil channels.

As illustrated in FIG. 5, in the partition part 30d, the upper wall 30a of the upper member 30 projects inward in the casing 20, and constitutes a separator extending across the ends of the upper wall 30a with regard to the lateral direction. A midpoint welding projection 30e is formed at the tip of the partition part 30d with regard to the projecting direction. The midpoint welding projection 30e extends along the lateral direction of the upper member 30 in conformity with the shape of the partition part 30d. As illustrated in FIG. 4, the ends of the midpoint welding projection 30e are continuous to the upper welding projection 30c.

As illustrated in FIG. 5, in the upper wall 30a of the upper member 30, a downstream part located downstream of the partition part 30d with regard to the oil flow direction is located above an upstream part located upstream of the partition part 30d with regard to the oil flow direction, and the filter 10 is housed in the downstream part of the upper member 30 located downstream of the partition part 30d with regard to the oil flow direction. A step 30f to which a frame 12 of the filter 10 is fit is formed in the downstream part of the peripheral wall 30b of the upper member 30 located downstream of the partition part 30d with regard to the oil flow direction. The step 30f is also formed on the partition part 30d.

As illustrated in FIG. 1, the oil outlet 22 is formed at an end of the upper wall 30a of the upper member 30 located the downstream with regard to the oil flow direction. The upper wall 30a has a flange 31 formed on a peripheral portion of the oil outlet 22 and extending radially from the oil outlet 22. An annular groove 31a is formed in the upper surface of the flange 31 and surrounds the oil outlet 22. Although not shown, a sealer is fitted in the annular groove 31a. The flange 31 also has insertion holes 31b and 31b in which fastening members (not shown) for fastening the oil strainer 1 to a cylinder block of the engine are inserted.

As illustrated in FIG. 2, the filter 10 is elongated in the oil flow direction as a whole. The filter 10 includes a mesh part 11 for filtering oil, a frame 12 surrounding the mesh part 11, and a rib 13 formed inside the frame 12. The mesh part 11, the frame 12, and the rib 13 are made of a resin material and formed as one piece. The mesh part 11 is composed of a fine mesh so as to capture foreign matter included in oil. As illustrated in FIG. 5, the entire circumference of the frame 12 is in close contact with the inner surface of the peripheral wall 30b of the upper member 30 while being fitted to the step 30f of the upper member 30.

The filter 10 is disposed to extend from a downstream end of the casing 20 with regard to the oil flow direction to a midpoint of the casing 20 with regard to the oil flow direction. The upstream part of the filter 10 with regard to the oil flow direction is at a location corresponding to the partition part 30d.

The lower member 40 includes a bottom wall 40a facing the upper wall 30a of the upper member 30 and a peripheral wall 40b extending upward from the periphery of the bottom wall 40a, forms an upwardly recessed shape as a whole, and is elongated in the oil flow direction. The downstream part in the oil flow direction of the lower member 40 is wider than the upstream part.

The bottom wall 40a of the lower member 40 is formed such that a part of the bottom wall 40a from the midpoint to a downstream part with regard to the oil flow direction is higher than its upstream part. The higher part of the bottom wall 40a corresponds to a part that houses the filter 10.

A cylinder part 41 downwardly projects from an upstream end of the bottom wall 40a with regard to the oil flow direction. The inside of the cylinder part 41 constitutes the oil inlet 21.

Figure 3:
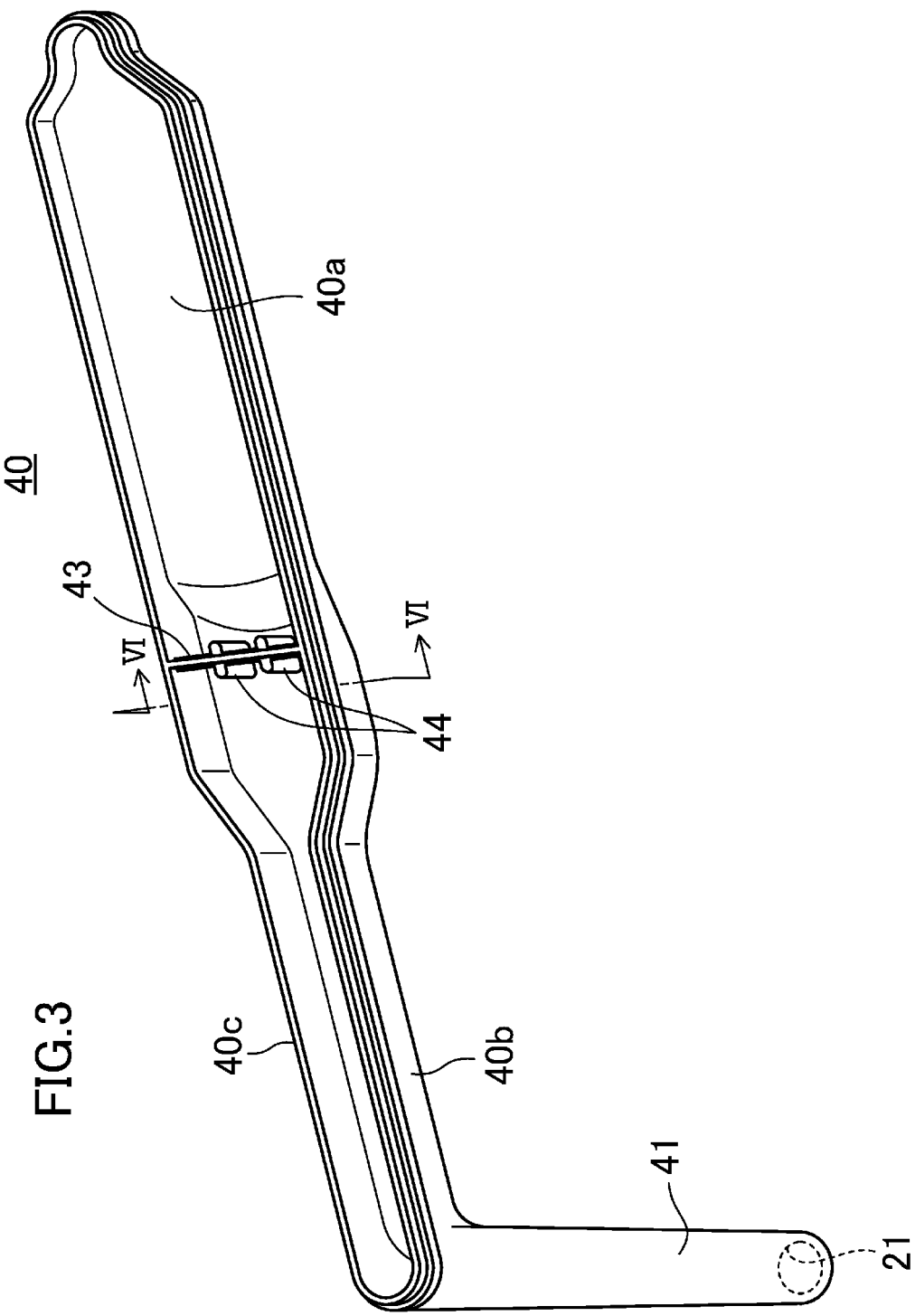
FIG. 3 is a perspective view of a lower member when viewed from above.

As also illustrated in FIG. 3, a lower welding projection 40c to be welded to the upper welding projection 30c formed on a sealing surface at the lower end of the upper member 30 projects upward from a sealing surface at the upper end of the peripheral wall 40b of the lower member 40. The upper welding projection 30c is formed on the entire circumference of the peripheral wall 30b.

Figure 6:
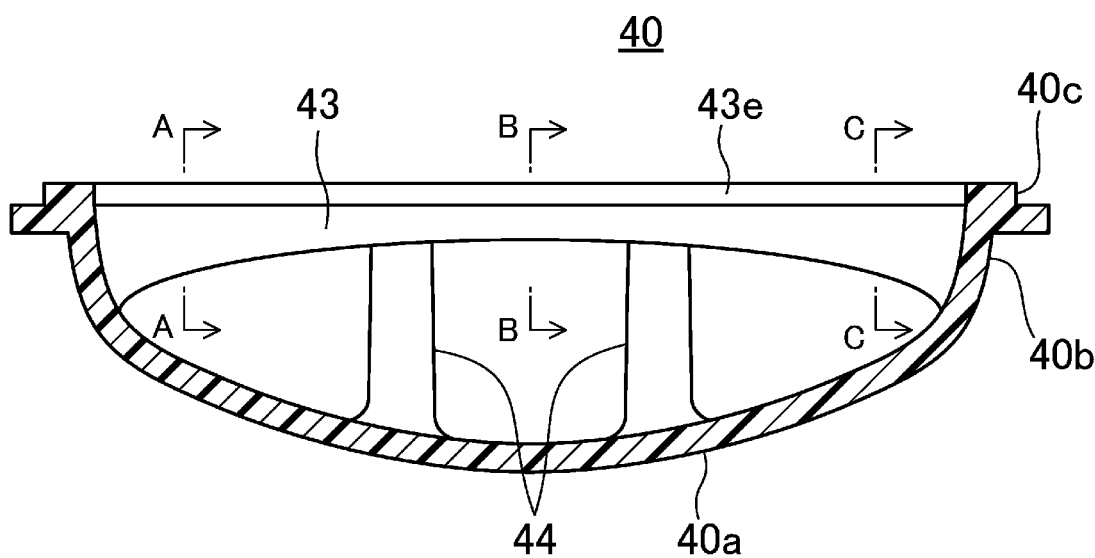
FIG. 6 is a cross-sectional view taken along line VI-VI in FIG. 3.

The lower member 40 has a sealing portion 43 for sealing the upstream space R1 and the downstream space R2. As illustrated in FIGS. 5 and 6, the sealing portion 43 has a bridge shape extending along the lateral direction of the casing 20 across the oil channel in the casing 20 and separated upward apart from the bottom wall surface of the oil channel in the casing 20.

Figure 7A:
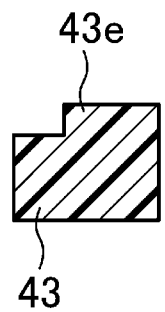
FIG. 7A is a cross-sectional view taken along line A-A in FIG. 6.
Figure 7B:
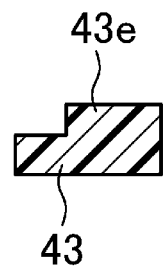
FIG. 7B is a cross-sectional view taken along line B-B in FIG. 6.
Figure 7C:
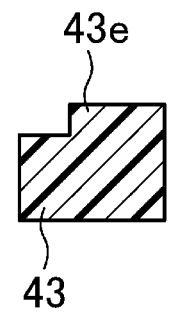
FIG. 7C is a cross-sectional view taken along line C-C in FIG. 6.

A illustrated in cross sections of FIGS. 7A to 7C, the sealing portion 43 has a body that is of an approximately prism shape as a whole, and a welding projection 43e projects upward from the upper surface of the body such that the body and the welding projection 43e are formed as one piece. The welding projection 43e of the sealing portion 43 extends across the ends of the sealing portion 43 with regard to the longitudinal direction. The vertical dimension of the sealing portion 43 in cross section decreases toward the center of the sealing portion 43 with regard to the longitudinal direction and increases toward the ends thereof. Thus, the sealing portion 43 is widest at the ends thereof. Such a sectional shape makes it difficult for the sealing portion 43 to bend when a load is applied from above.

As illustrated in FIG. 5, the welding projection 43e of the sealing portion 43 is welded to the midpoint welding projection 30e on the sealing surface at the lower end of the partition part 30d of the upper member 30. With the sealing portion 43 being welded to the midpoint welding projection 30e, a wide range of the entire part of the partition part 30d with regard to the longitudinal direction is supported by the sealing portion 43 below. The support of the partition part 30d by the sealing portion 43 can reduce deformation of the partition part 30d so that deformation of the step 30f of the partition part 30d can be deformed, thus suppressing formation of a clearance between the filter 10 and the frame 12.

The bottom wall 40a of the lower member 40 is provided with supports 44. The supports 44 support the sealing portion 43 from below, and each has a columnar shape projecting upward from the bottom wall 40a and reaching the sealing portion 43. The upper ends of the supports 44 are integrated with the sealing portion 43.

As illustrated in FIGS. 3 and 6, the supports 44 are separated from each other along the lateral direction of the casing 20. The supports 44 are also separated from the peripheral wall 40b of the lower member 40. Thus, oil flows between the supports 44 and between the peripheral wall 40b and each of the supports 44. The supports 44 are elongated along the oil flow direction, and hardly inhibit the oil flow. Each of the supports 44 preferably has a shape that does not significantly inhibit the oil flow and preferably has a streamline shape, for example.

It will now be described how the oil strainer 1 is fabricated. First, a resin material is molded such that the filter 10, the upper member 30, and the lower member 40 can be obtained. Then, the filter 10 is housed in the upper member 30, and the frame 12 of the filter 10 is fitted to the step 30f.

Next, with hot plate welding, for example, the upper welding projection 30c of the upper member 30 is welded to the lower welding projection 40c of the lower member 40, and the midpoint welding projection 30e of the upper member 30 is welded to the welding projection 43e of the sealing portion 43 of the lower member 40. In this manner, as illustrated in FIG. 5, the upper member 30 and the lower member 40 are sealed in their entire circumferences. In a state where the sealing portion 43 is welded to the midpoint welding projection 30e, the entire part of the partition part 30d in the longitudinal direction is supported by the sealing portion 43 from below. Thus, deformation of the partition part 30d is reduced. In this manner, deformation of the step 30f formed in the partition part 30d is reduced, and a clearance is not easily formed between the step 30f and the frame 12 of the filter 10. Accordingly, the frame 12 of the filter 10 is not easily detached from the step 30f after a long-term use, and a clearance is not easily formed between the frame 12 and the step 30f. Thus, sealing performance can be obtained between the upstream space R1 and the downstream space R2. At this time, since the ends of the sealing portion 43 are wider than an intermediate portion of the sealing portion 43 with regard the longitudinal direction, deformation of the partition part 30d can be further reduced. In addition, since the supports 44 support the sealing portion 43, deformation of the partition part 30d can be even further reduced.

The case of using the thus-configured oil strainer 1 will now be described. Oil in the oil pan is sucked through the oil inlet 21 of the oil strainer 1 and flows into the upstream space R1. Oil in the upstream space R1 flows toward the downstream space R2 in the casing 20, and reaches the filter 10 through the gap between the sealing portion 43 and the bottom wall 40a of the casing 20. Since the supports 44 are elongated along the oil flow direction, the oil flow is not easily hindered while oil passes through the gap between the sealing portion 43 and the bottom wall 40a of the casing 20.

Oil that has reached the filter 10 flows obliquely upward toward the oil outlet 22, and is filtered while passing through the mesh part 11. In this embodiment, the entire part of the partition part 30d in the longitudinal direction is supported by the sealing portion 43 from below, and thereby, the frame 12 of the filter 10 is not easily detached from the step 30f. In addition, since a clearance is not easily formed between the frame 12 and the step 30f, it is possible to prevent unfiltered oil from reaching the downstream space R2 through a gap between the frame 12 and the step 30f.

As described above, in the oil strainer 1 of the first embodiment, the sealing portion 43 that seals the gap between the upstream space R1 and the downstream space R2 in the casing 20 has a bridge shape separated from the inner wall surface of the casing 20, thereby ensuring sealing of a wide gap between the upstream space R1 and the downstream space R2 while avoiding inhibition of an oil flow. In this manner, unfiltered oil upstream of the filter 10 does not leak toward a downstream portion without filtration so that filtration performance can be enhanced.

In addition, since the sealing portion 43 of the lower member 40 is welded to the partition part 30d of the upper member 30, performance in sealing the gap between the upstream space R1 and the downstream space R2 can be further enhanced, and the upper member 30 and the lower member 40 can be more firmly integrated.

Further, since the supports 44 supporting the sealing portion 43 can reduce deformation of the sealing portion 43 even after a long-term use, sealing performance can be obtained. The number of the supports 44 may be one, or the number of the supports 44 may be three or more. Each of the supports 44 may be in the shape of a cylindrical column or a prism, for example.

Figure 8A:
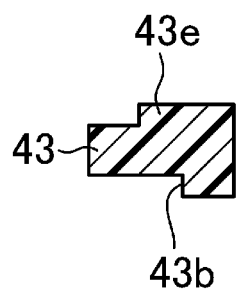
FIGS. 8A to 8C illustrate a first variation of the first embodiment and correspond to FIGS. 7A to 7C.
Figure 8B:
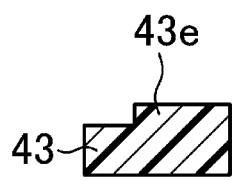
Figure 8C:
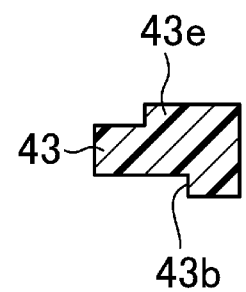
Figure 9A:
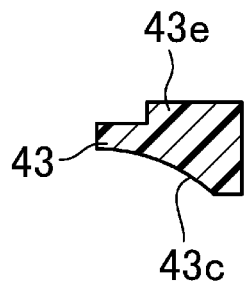
FIGS. 9A to 9C illustrate a second variation of the first embodiment and correspond to FIGS. 7A to 7C.
Figure 9B:
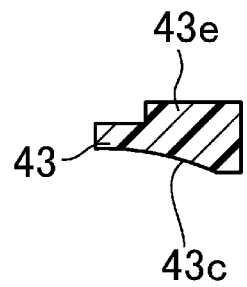
Figure 9C:
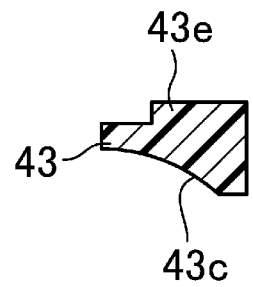

The cross-sectional shape of the sealing portion 43 is not limited to the above described shapes, and may be a shape described in a first variation illustrated in FIG. 8 or a shape described in a second variation illustrated in FIG. 9, for example. In the first variation, a recess 43b is formed in the lower surface of the sealing portion 43 except a center portion in the longitudinal direction. The recess 43b is formed in the upstream part of the sealing portion 43 with regard to the oil flow direction. Thus, lower sides of the wide portions of the sealing portion 43 at the ends in the longitudinal direction are cut out, and thereby, oil easily flows from an upstream side to a downstream side of the sealing portion 43. The recess 43b may be provided across the ends in the longitudinal direction of the sealing portion 43.

In the second variation, a recess 43c is continuously formed in the lower surface of the sealing portion 43 across the ends in the longitudinal direction. The inner surface of the recess 43c is curved. Thus, oil can flow more smoothly. The recess 43c may be partially provided only in the ends of the sealing portion 43 in the longitudinal direction.

Although the filter 10 is fitted in the upper member 30 in the first embodiment, the filter 10 may be fitted in the lower member 40.

Second Embodiment

FIG. 10 is a disassembled perspective view illustrating an oil strainer 1 according to a second embodiment of the present invention. FIG. 11 is a partial cross-sectional view illustrating the oil strainer 1 of the second embodiment. The second embodiment is different from the first embodiment in that a filter 10 is housed in a lower member 40 and that the filter 10 is held between a sealing portion 43 and an upper member 30. The following description will be given only on aspects different from the first embodiment.

A step 40f to which a frame 12 of the filter 10 is fitted is formed on the inner surface of a peripheral wall 40b of the lower member 40. At the upstream end of the frame 12 of the filter 10 with regard to the oil flow direction, an intervening plate (an intervening part) 14 held between the sealing portion 43 and the upper member 30 is provided above the frame 12 and is integrated with the frame 12. The intervening plate 14 is located above a mesh part 11, and extends across the ends of the casing 20 of the lateral direction. A welding projection 14e is formed on the upper surface of the intervening plate 14. The welding projection 14e is welded to the midpoint welding projection 30e of the partition part 30d.

The sealing portion 43 of the lower member 40 extends along the lower surface of the intervening plate 14 of the filter 10 and is configured to come in contact with the entire lower surface of the intervening plate 14. Each of supports 44 is in the shape of an approximately cylindrical column in the second embodiment, but may have a shape elongated along the oil flow direction.

In second embodiment, the entire intervening plate 14 of the filter 10 can be supported by the sealing portion 43 from below, and thus, the welding projection 14e of the intervening plate 14 can be welded to the midpoint welding projection 30e of the partition part 30d without fail so that the gap between an upstream space R1 and a downstream space R2 can be sealed. In addition, the intervening plate 14 can be always supported from below, and thus, the intervening plate 14 is not separated from the partition part 30d of the upper member 30 so that sufficient sealing performance between the upstream space R1 and the downstream space R2 can be obtained.

In addition, since the intervening plate 14 is made thinner than the frame 12 of the filter 10, the total thickness of the intervening plate 14 and the sealing portion 43 can be reduced, thereby reducing distribution resistance of oil.

As described above, in the oil strainer 1 of the second embodiment, the sealing portion 43 can be used to seal the gap between the upstream space R1 and the downstream space R2 in the casing 20. The bridge shape of the sealing portion 43 separated from the wall surface in the casing 20 ensures sealing of a wide range between the upstream space R1 and the downstream space R2 without inhibiting an oil flow. Thus, in a manner similar to the first embodiment, filtration performance can be enhanced by preventing unfiltered oil upstream of the filter 10 from leaking downward without filtration.

In addition, the intervening plate 14 of the filter 10 can be held between the sealing portion 43 of the lower member 40 and the upper member 30. Thus, the filter 10 can be stably held at a predetermined position in the casing 20.

Although the filter 10 is fitted in the lower member 40 in the second embodiment, the filter 10 may be fitted in the upper member 30.

Third Embodiment

Figure 12:
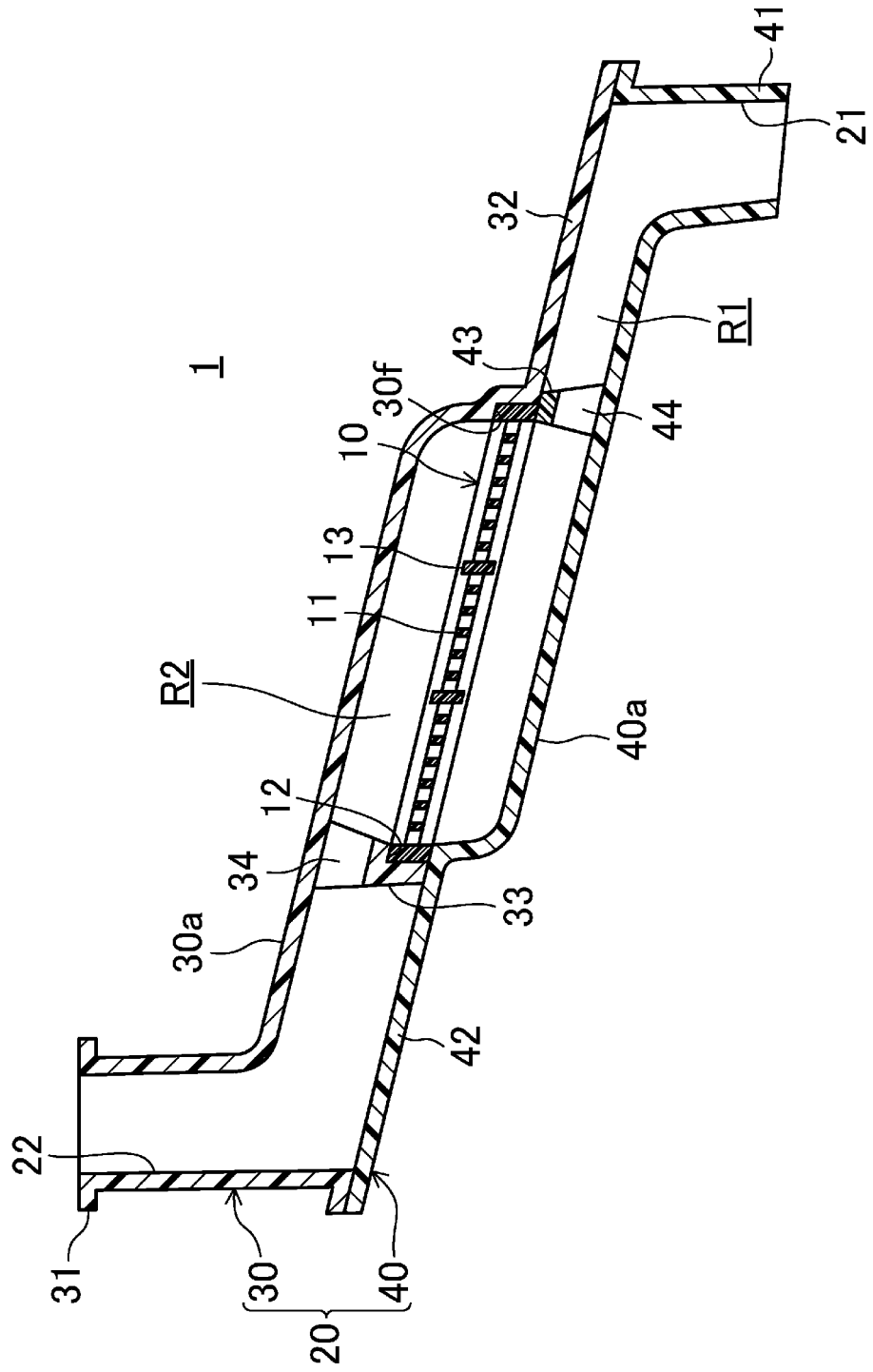
FIG. 12 is a cross-sectional view illustrating an oil strainer of a third embodiment.

FIG. 12 is a cross-sectional view illustrating an oil strainer 1 according to a third embodiment of the present invention. The third embodiment is different from the first embodiment in that two sealing portions are provided so as to individually seal an upstream part and a downstream part of a filter 10 with regard to the oil flow direction. The following description will be given on aspects different from the first embodiment.

The filter 10 of the third embodiment is disposed at a midpoint with regard to an oil flow direction in a casing 20. A sealing portion 33 is formed on the inner surface an upper member 30 such that the sealing portion 33 has a bridge shape separated from the wall surface in the casing 20 and extending across an oil channel. The sealing portion 33 is supported by a support 34 projecting downward from an upper wall 30a of the upper member 30. The sealing portion 33 is welded to the inner surface of a lower member 40 across both ends in the lateral direction. In this manner, a wide range between an upstream space R1 and a downstream space R2 can be sealed. A step 30f on the inner surface of the upper member 30 is also formed on the sealing portion 33, and part of a frame 12 of the filter 10 is fitted in the sealing portion 33. In this state, a wide range of the frame 12 across the ends in the lateral direction can be held between the sealing portion 33 and a flat plate portion 42 of the lower member 40. In addition, a flat plate portion 32 is formed in an upstream part of the upper member 30 with regard to the oil flow direction, and blocks an upstream part of the lower member 40 with regard to the oil flow direction.

The sealing portion 43 of the lower member 40 supports the frame 12 of the filter 10 flow below. The sealing portion 43 and the upper member 30 vertically hold the frame 12 of the filter 10 therebetween. This configuration can make it difficult for the frame 12 of the filter 10 to be detached from the step 30f of the upper member 30, and can suppress occurrence of a clearance between the frame 12 and the step 30f. Thus, a gap between the upstream space R1 and the downstream space R2 can be sealed. The sealing portion 43 can be welded to the upper member 30. In the third embodiment, a welding projection formed at the interface between the upper member 30 and the lower member 40 is omitted.

The flat plate portion 42 is formed in a downstream part of the lower member 40 with regard to the oil flow direction, and blocks the downstream part of the upper member 30 with regard to the oil flow direction.

As described above, in the oil strainer 1 of the third embodiment, a gap between the upstream space R1 and the downstream space R2 in the casing 20 can be sealed with the sealing portions 33 and 43. Since the sealing portions 33 and 43 are separated from the inner wall surface of the casing 20 and have bridge shapes, sealing of a wide range between the upstream space R1 and the downstream space R2 can be ensured without inhibition of an oil flow. As a result, in a manner similar to the first embodiment, filtration performance can be enhanced by preventing unfiltered oil upstream of the filter 10 from leaking downward without filtration.

In the third embodiment, the filter 10 is fitted in the upper member 30. Alternatively, the filter 10 may be fitted in the lower member 40.

Although not shown, an intervening plate may be formed on a downstream part of the frame 12 of the filter 10 with regard to the oil flow direction such that the sealing portion 33 with a reduced thickness can hold the intervening plate. Thus, the total thickness of the intervening plate and the sealing portion 33 can be reduced, thereby reducing the flow resistance of oil. In this case, sealing performance is not impaired, either.

Figure 13:
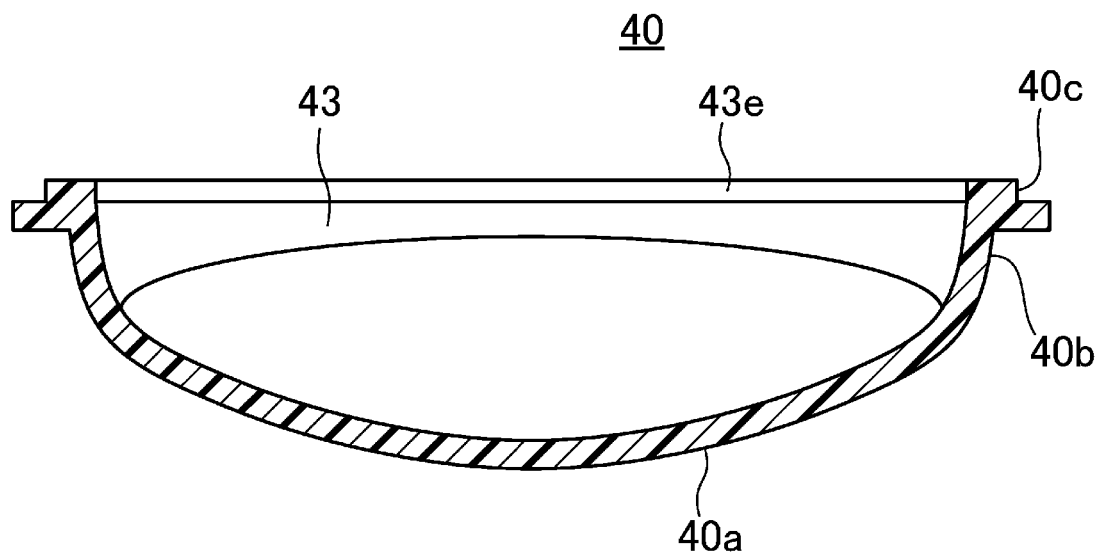
FIG. 13 illustrates a first variation of the third embodiment and corresponds to FIG. 6.

FIG. 13 is a cross-sectional view illustrating a lower member 40 according to a first variation of the third embodiment. In this first variation, the supports 44 are omitted. This configuration easies distribution of oil. One of the supports 44 may be omitted.

Figure 14:
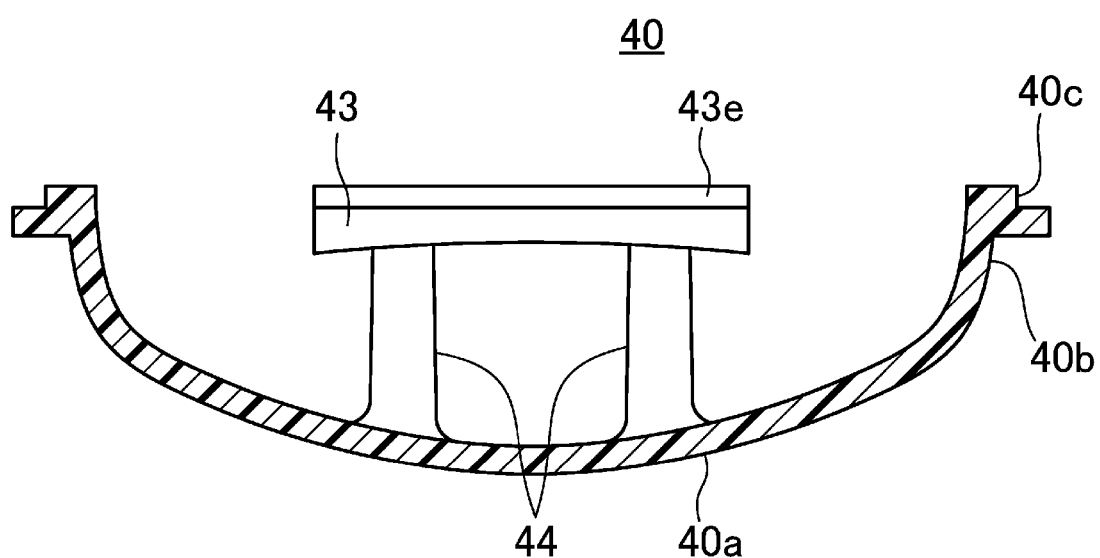
FIG. 14 illustrates a second variation of the third embodiment and corresponds to FIG. 6.

FIG. 14 is a cross-sectional view illustrating a lower member 40 according to a second variation of the third embodiment. In the second variation, ends of the sealing portion 43 in the longitudinal direction are not continuous to the peripheral wall 40b of the lower member 40 so that oil can be distributed between the ends of the sealing portion 43 in the longitudinal direction and the peripheral wall 40b of the lower member 40. The sealing portion 43 and the supports 44 form an arch shape, thereby obtaining a sufficient degree of strength. The sealing portion 43 may be longer or shorter than that illustrated in FIG. 14. The first and second variations of the third embodiment are applicable to the first and second embodiments.

Figure 15:
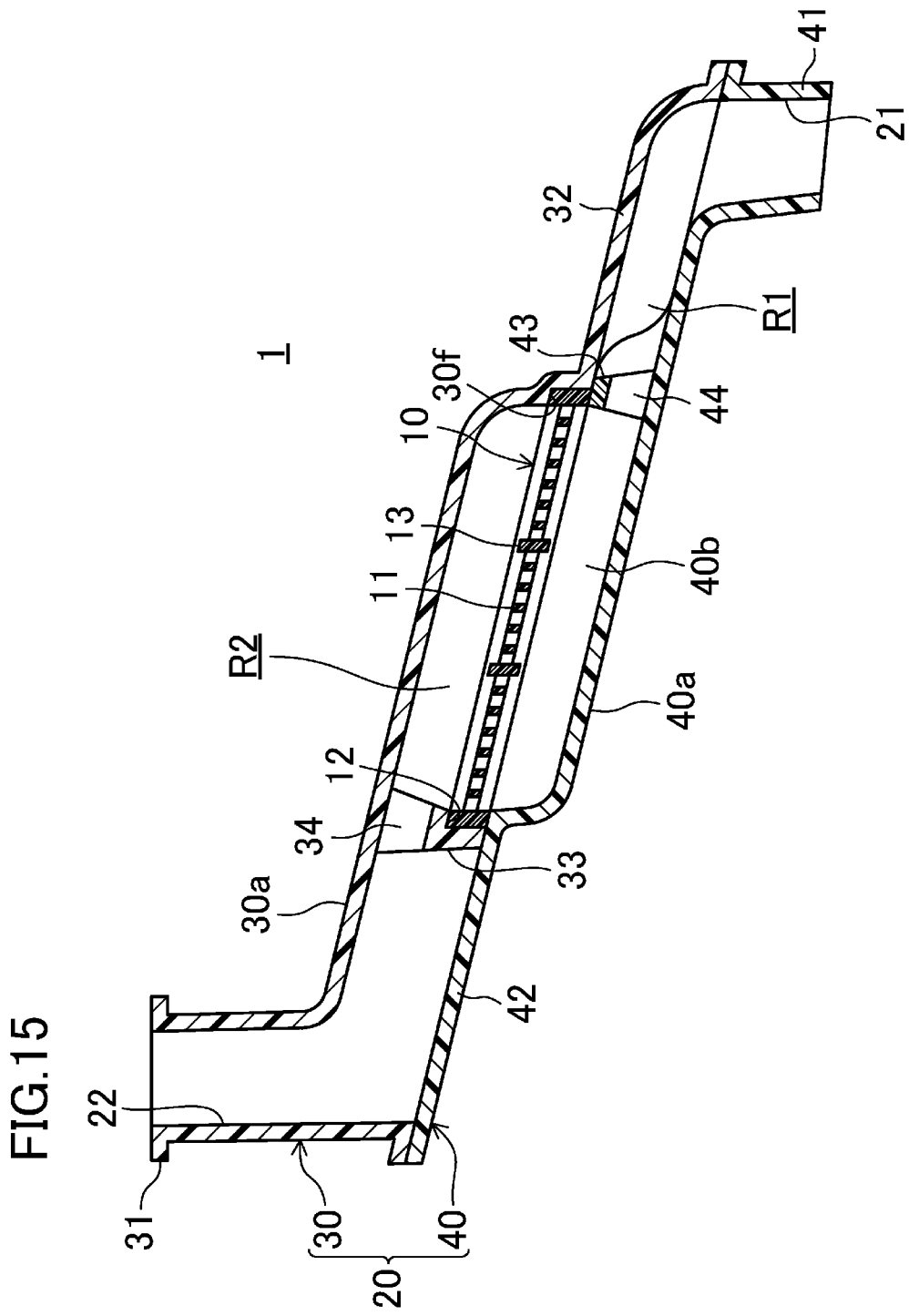
FIG. 15 illustrates a third variation of the third embodiment and corresponds to FIG. 12.
Figure 16:
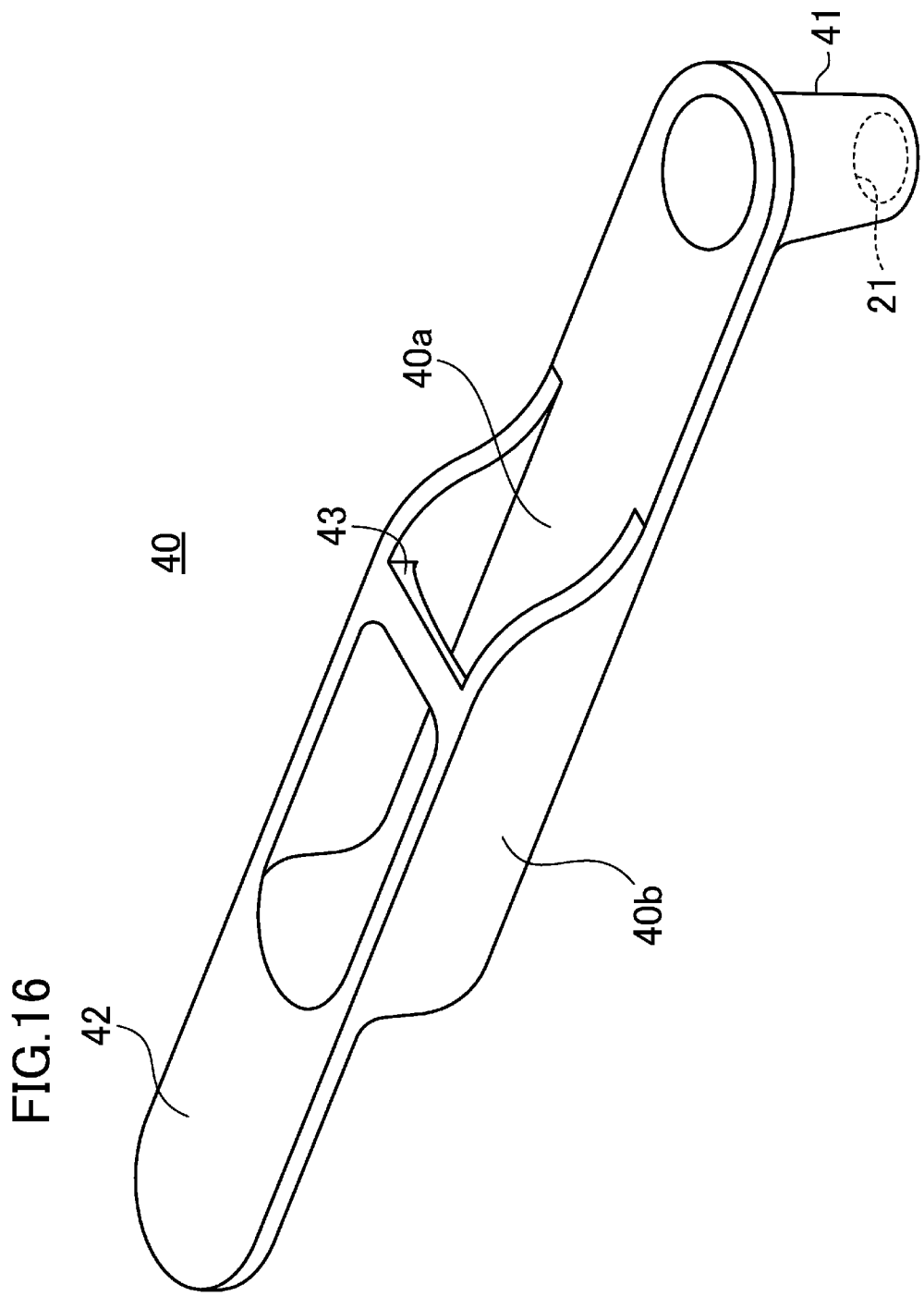
FIG. 16 is a perspective view illustrating a lower member of the third variation of the third embodiment.

FIG. 15 is a cross-sectional view illustrating an oil strainer 1 according to a third variation of the third embodiment. In the third variation, the location at which the upper member 30 is separated from the lower member 40 is shifted to a downstream side in an upstream part upstream of the sealing portion 43 of the oil strainer 1 with regard to the oil flow direction. This shift makes the upstream part upstream of the sealing portion 43 of the lower member 40 with regard to the oil flow direction have a flat plate structure that does not include the peripheral wall 40b, as illustrated in FIG. 16. Thus, the rigidity of the upstream part of the lower member 40 with regard to the oil flow direction decreases. Thus, even in a case where surfaces of the upper member 30 and the lower member 40 to be welded do not strictly concede with each other because of, for example, the influence of a formation error before vibration welding, the lower member 40 can be deformed so as to be in close contact with the upper member 30 in joining the surfaces of the upper member 30 and the lower member 40 to be welded and vibrating these surfaces, thereby ensuring welding of the upper member 30 and the lower member 40. Although the supports 44 are omitted in the third variation, the supports 44 may be provided, or the second variation of the third embodiment may be applied to the third variation.

Fourth Embodiment

Figure 17:
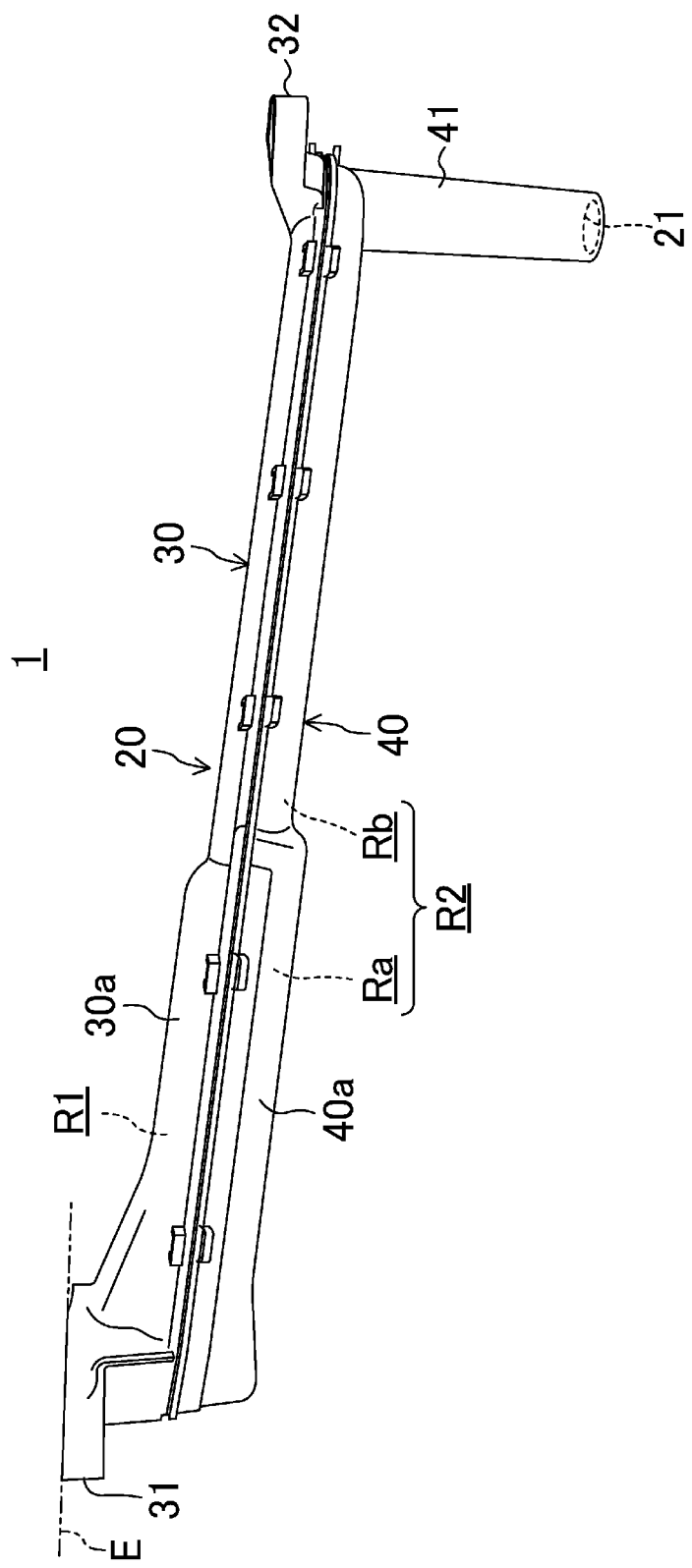
FIG. 17 is a side view illustrating an oil strainer according to a fourth embodiment.
Figure 18:
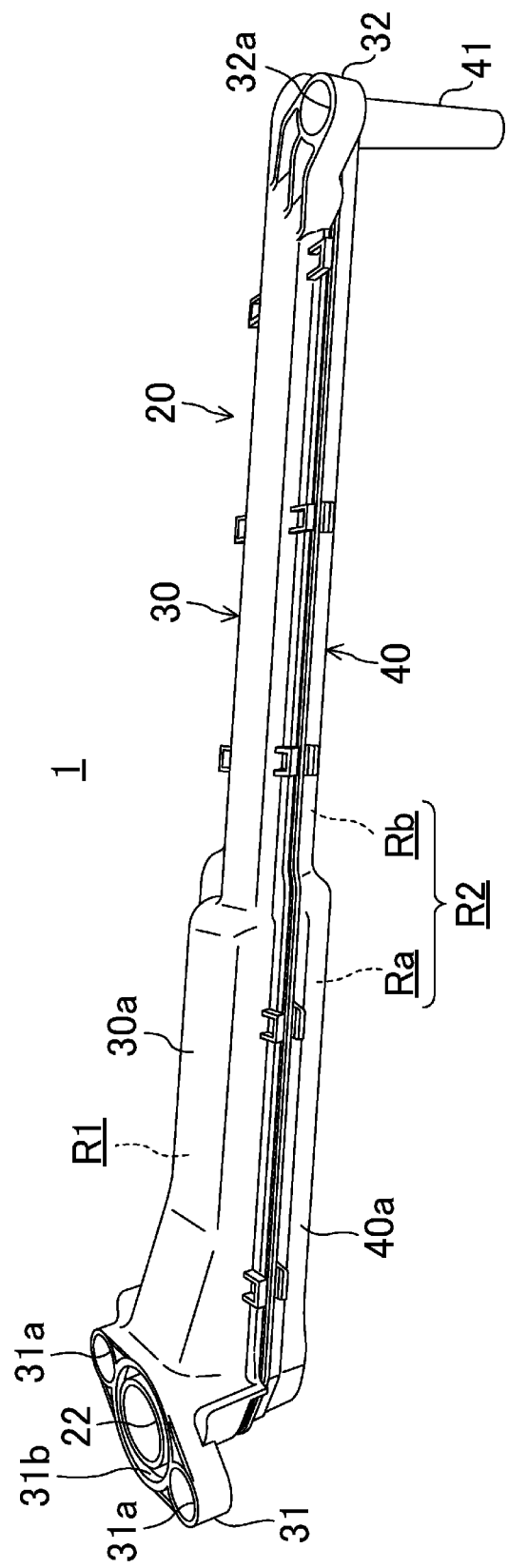
FIG. 18 is a perspective view of the oil strainer of the fourth embodiment when viewed from above.

FIGS. 17 and 18 illustrate an oil strainer 1 according to a fourth embodiment of the present invention. Although not shown, the oil strainer 1 is disposed in an oil pan at the bottom of an engine of an automobile, for example, and is attached to an engine block E (indicated by virtual lines only in FIG. 17). In this engine, a suction part (a part to which an oil outlet 22 of the oil strainer 1 is connected) of an oil pump is greatly separated from an oil suction part (a part at which an oil inlet 21 of the oil strainer 1 is disposed) of the oil pan not only in the vertical direction but also in the horizontal direction.

Figure 19:
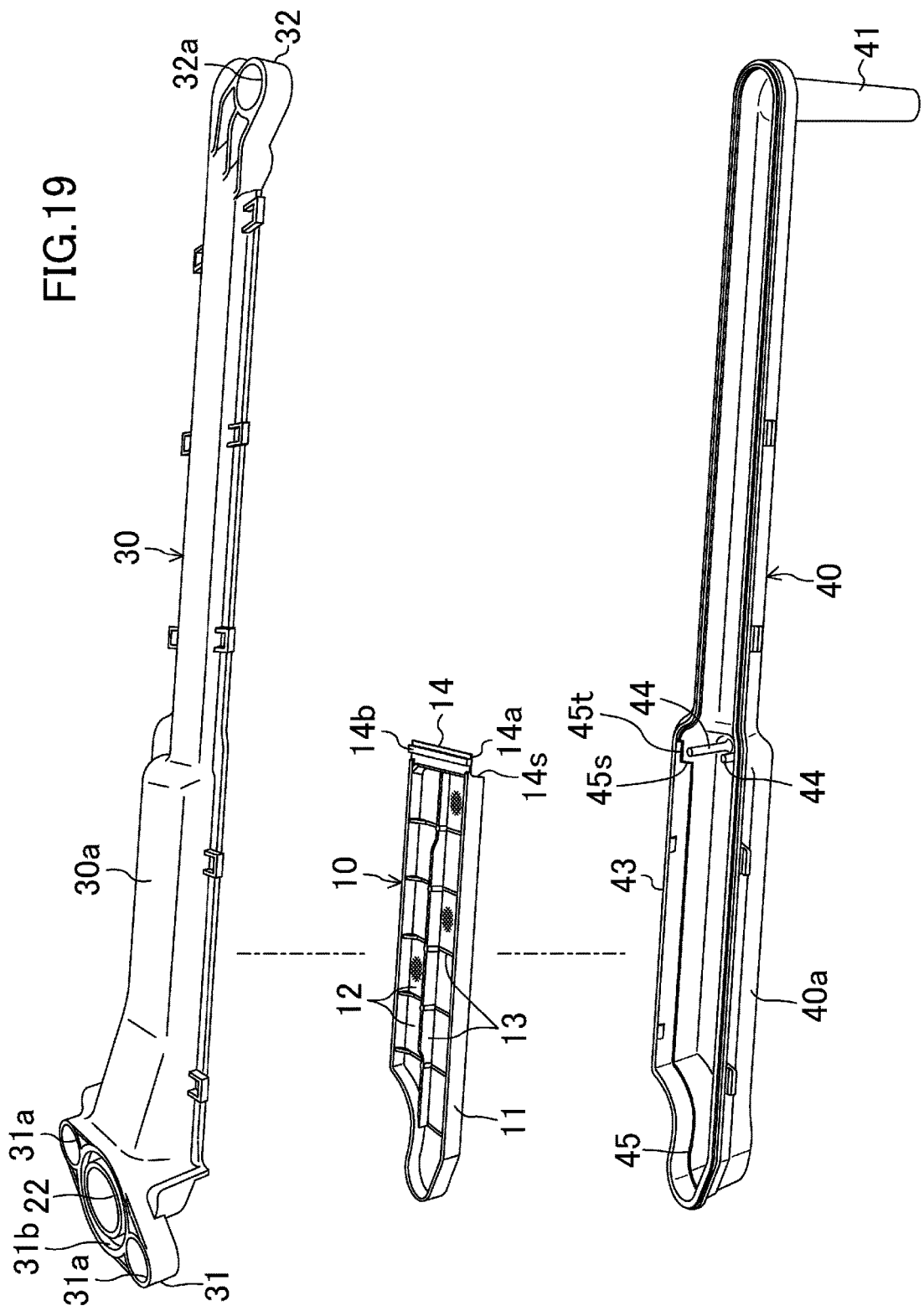
FIG. 19 is a disassembled perspective view of the oil strainer of the fourth embodiment.

As illustrated in FIG. 19, the oil strainer 1 includes a filter 10 for filtering oil and a cylindrical casing 20 housing the filter 10 and having the oil inlet 21 and the oil outlet 22. The oil strainer 1 is configured such that oil that has flowed into the casing 20 through the oil inlet 21 is filtered while passing through the filter 10 and flows out of the oil outlet 22.

The oil outlet 22 is disposed at one end of the casing 20 in the longitudinal direction (i.e., at the left in FIGS. 17 to 19), and the oil inlet 21 is provided the other end of the casing (i.e., at the right in FIGS. 17 to 19). The casing 20 has a slender shape as a whole in order to separate the oil inlet 21 and the oil outlet 22 widely in the horizontal direction. The reason for such wide separation between the oil inlet 21 and the oil outlet 22 is that the suction part of the oil pump is widely separated from the oil suction part in the oil pan in the horizontal direction.

The casing 20 includes an upper member (a first section) 30 and a lower member (a second section) 40 that are separated from each other in the vertical direction that intersects with the longitudinal direction of the casing 20. The upper member 30 and the lower member 40 are made of resin. The upper member 30 has a recessed shape that is open downward as a whole.

The upper member 30 includes a protuberance 30a extending from an end of the upper member 30 to an intermediate portion of the upper member 30 along the longitudinal direction. The protuberance 30a protrudes upward and sideways from the upper member 30. The formation of the protuberance 30a enlarges interior space of the upper member 30.

Figure 20:
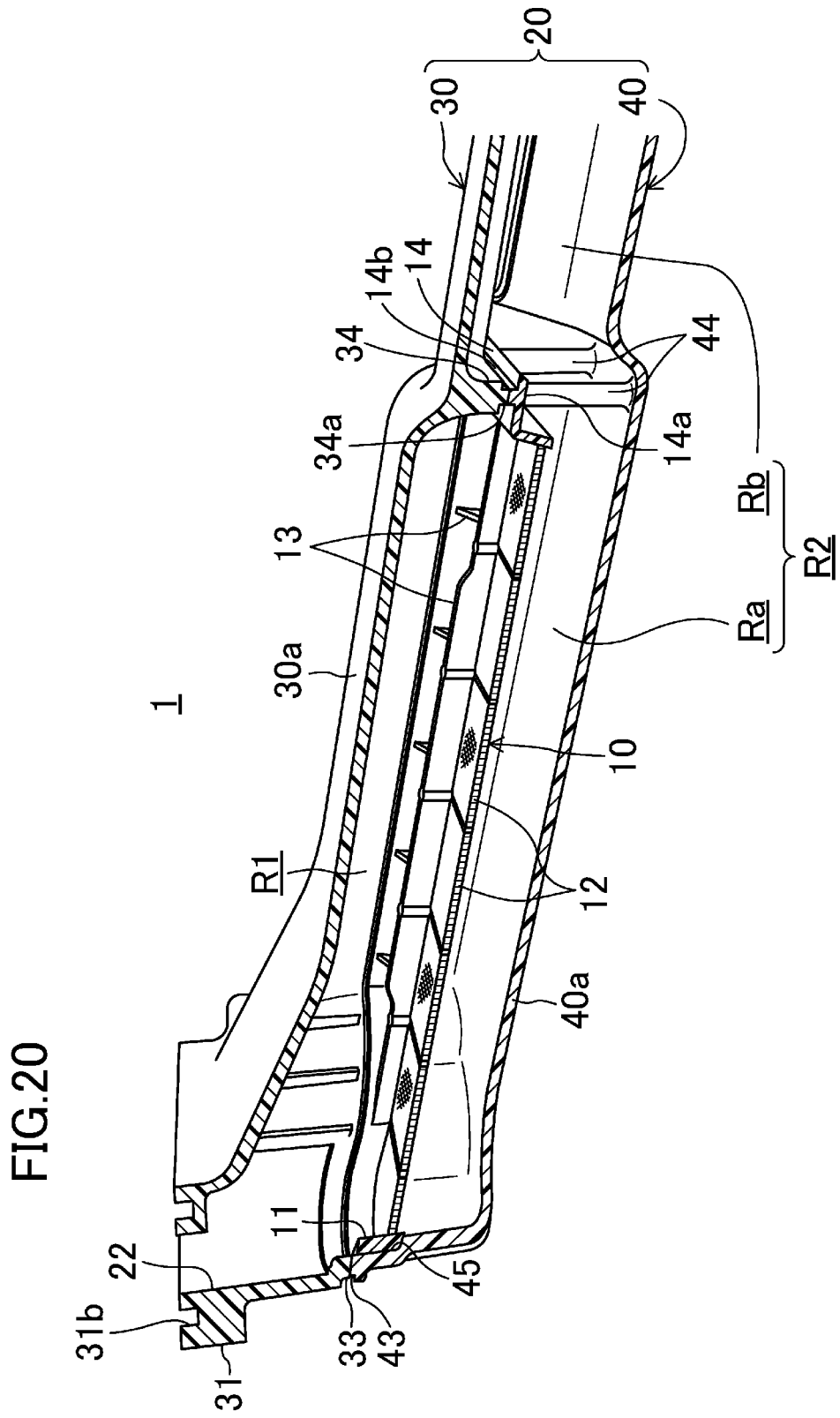
FIG. 20 is a cross-sectional view of the oil strainer of the fourth embodiment.

As illustrated in FIG. 20, the degree of upward protrusion of the protuberance 30a increases as the distance to the end of the casing 20 in the longitudinal direction (i.e., to the oil outlet 22) decreases. The inside of the protuberance 30a is a downstream space R1 into which oil after filtration with the filter 10 flows.

The oil outlet 22 is disposed at one end in the longitudinal direction of the upper wall of the upper member 30 and penetrates the upper member 30 in the vertical direction. A flange 31 is formed on a peripheral portion of the oil outlet 22 and extends substantially horizontally. The flange 31 has insertion holes 31a and 31a which are spaced apart from one another along the circumference of the oil outlet 22 and in which fastening members (not shown) such as bolts for fastening the oil strainer 1 to the engine block E are to be inserted. An O-ring groove 31b in which an O-ring (not shown) is fitted is formed in the upper surface of the flange 31 and surrounds the opening of the oil outlet 22.

As illustrated in FIGS. 17 and 18, an attaching portion 32 horizontally projects from the other end in the longitudinal direction of the upper member 30. The attaching portion 32 has an insertion hole 32a for a fastening member that is to be screwed into the engine block E.

Figure 22:
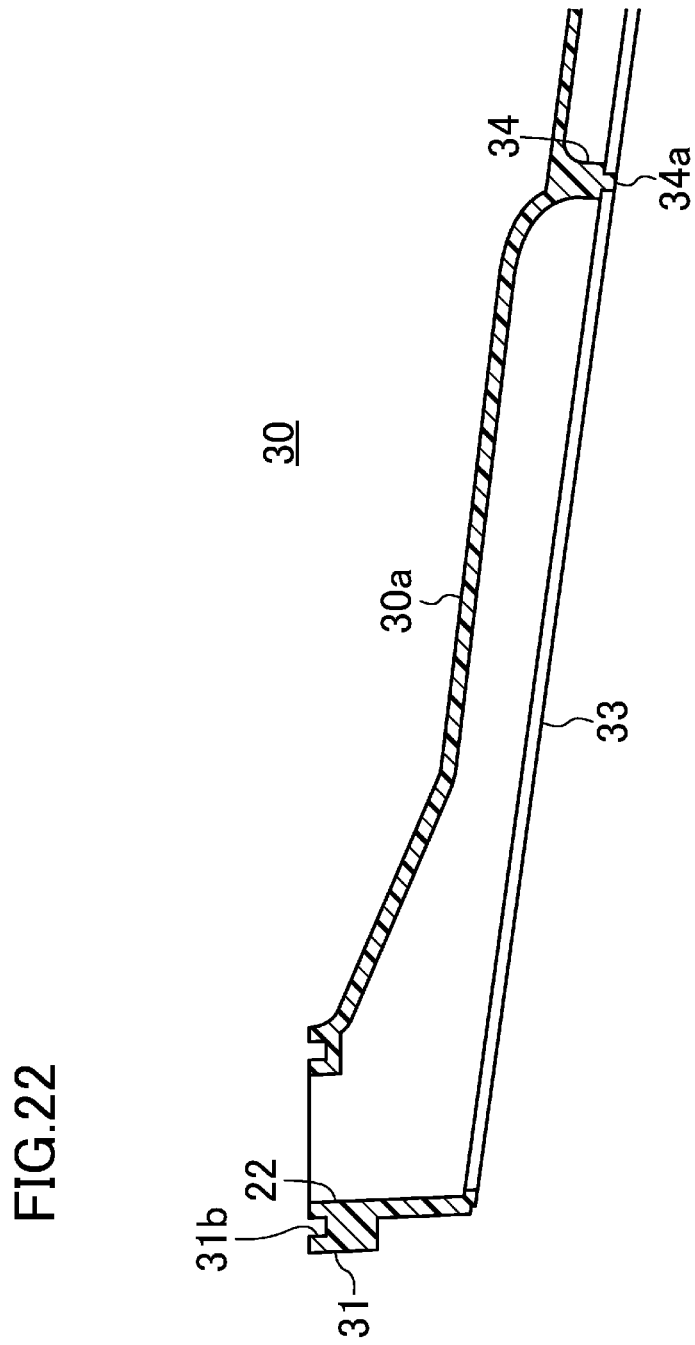
FIG. 22 is a cross-sectional view illustrating an end in a longitudinal direction of an upper member of the fourth embodiment.

The outer periphery that is an edge of the upper member 30 at which the upper member 30 is open is continuous in the entire circumference thereof, and serves as an upper welding projection 33 projecting downward as illustrated in FIGS. 20 and 22. The tip (the lower end face) of the upper welding projection 33 is located on the same planar surface. The upper welding projection 33 is welded to a lower member 40, which will be described later. The welding reduces the dimension of the upper welding projection 33 in the direction in which the upper welding projection 33 projects.

A partition wall 34 for defining the downstream space R1 in the casing 20 is formed in an intermediate portion in the longitudinal direction of the inner surface of an upper member 30. The partition wall 34 projects downward, extends along the lateral direction of the upper member 30, and is continuous to the side surfaces of the upper member 30. A contact portion 34a to be in contact with an end (an intervening plate portion 14, which will be described later) of the filter 10 corresponding to an intermediate portion in the longitudinal direction of the casing 20 is formed on the lower end face of the partition wall 34 and projects downward.

The contact portion 34a is a welding projection similar to the upper welding projection 33, and has a ridge shape continuously extending along the lateral direction of the upper member 30. The ends in the longitudinal direction of the contact portion 34a are continuous to the upper welding projection 33. The lower end face of the contact portion 34a is located on the same planar surface as the lower end face of the upper welding projection 33 after welding. Thus, after the welding, the lower end face of the contact portion 34a and the lower end face of the upper welding projection 33 are continuous in a ring shape.

As illustrated in FIG. 19, the lower member 40 has a recessed shape that is open upward. The lower member 40 has a protuberance 40a extending from an end in the longitudinal direction to an intermediate portion of the lower member 40. The protuberance 40a protrudes downward and sideways from the lower member 40. As illustrated in FIG. 20, the inside of the protuberance 40a is a space Ra in which unfiltered oil before filtration with the filter 10 is distributed.

In the casing 20, a space Rb closer to the other end in the longitudinal direction of the casing 20 than the filter 10 communicates with the space Ra. The space Rb is elongated along the longitudinal direction of the casing 20. The space Ra and the space Rb constitute an upstream space R2 serving as an oil channel in which oil that is yet to flow into the filter 10 is distributed.

As illustrated in FIGS. 17 and 18, a cylinder part 41 extending downward is formed at the other end in the longitudinal direction of the lower wall of the lower member 40. The inside of the cylinder part 41 serves as an oil inlet 21, and communicates with the upstream space Rb of the casing 20.

The outer periphery that is an edge of the lower member 40 at which the lower member 40 is open is continuous in the entire circumference thereof, and as illustrated in FIG. 19, serves as a lower welding projection 43 projecting upward. The tip (the upper end face) of the lower welding projection 43 is located on the same planar surface. The lower welding projection 43 is welded to the upper welding projection 33 along the entire circumference.

Two projections 44 and 44 are formed on an intermediate portion in the longitudinal direction of the inner surface of the lower member 40. The projections 44 and 44 serve as supports for supporting an end of the filter 10 (the intervening plate portion 14) corresponding to the intermediate portion in longitudinal direction of the casing 20. The heights of the projections 44 and 44 are selected such that the intervening plate portion 14 of the filter 10 is in contact with the contact portion 34a.

The projections 44 and 44 are formed as one piece on the lower member 40, and each forms a cylindrical columnar shape. The projections 44 and 44 are separated inward from the inner side surfaces of the lower member 40, and are separated from each other along the lateral direction of the lower member 40. The tips (the upper end surfaces) of the projections 44 and 44 are substantially flat.

A fitting recess (a fitting part) 45 into which the filter 10 is to be fit, is formed in the inner surface of the formed lower member 40. The fitting recess 45 extends from an end to an intermediate portion of the lower member 40 in the longitudinal direction, and is formed such that a peripheral portion of the filter 10 except an end (the intervening plate portion 14) corresponding to the intermediate portion in the longitudinal direction of the casing 20 is fitted in the fitting recess 45.

That is, in the fitting recess 45, a stopper 45s forms a step, and an end 14s of a frame 11 of the filter 10 is fitted in the stopper 45s. The fitting of the end 14s of the frame 11 of the filter 10 in the stopper 45s can prevent the filter 10 from being displaced in the longitudinal direction of the filter 10. On the other hand, a stopper 45t is formed at the other end of the fitting recess (the fitting part) 45 opposite to the stopper 45s, and forms a step. The ends of the lower member 40 are fitted to the stopper 45t.

The filter 10 is made of a resin material and has a plate shape. The filter 10 extends from an end to an intermediate portion in in the longitudinal direction of the casing 20. In this manner, the reason why the filter 10 does not extend across the ends in the longitudinal direction of the casing 20 is that a filtration area necessary for the filter 10 can be obtained without this configuration. If the filter 10 had a slender shape extending across the ends in the longitudinal direction of the casing 20, a formation failure would be more likely to occur and it would be difficult to obtain the strength.

As also illustrated in FIG. 19, the filter 10 includes a frame 11, a mesh part 12 disposed inside the frame 11, ribs 13 for reinforcing the mesh part 12, and an intervening plate portion 14 between the contact portion 34a and the projections 44 and 44. These components are formed as one piece by using a resin material. The frame 11 is continuous along the circumference of the filter 10, and has a plate shape extending in the vertical direction. The frame 11 is fitted in the fitting recess 45 of the lower member 40. While the frame 11 is fitted in the fitting recess 45, no oil leakage occurs between the frame 11 and the inner surface of the fitting recess 45.

The mesh part 12 has a large number of pores. The ribs 13 are integrated with the mesh part 12, and extend in the lateral direction and the longitudinal direction of the filter 10. The ribs 13 are continuous to the frame 11.

The intervening plate portion 14 is located at the other end in the longitudinal direction of the filter 10, projects substantially horizontally from the frame 11, and extends along the lateral direction of the filter 10. The lower surface of the intervening plate portion 14 is substantially flat, and serve as a lower contact surface 14*a* with which the tips of the projections 44 and 44 are in contact. A projection 14*b* extending along the lateral direction of the filter 10 is formed on the upper surface of the intervening plate portion 14. The projection 14*b* is disposed at a location corresponding to the contact portion 34*a* of the upper member 30, and extends substantially in parallel with the contact portion 34*a*. The contact portion 34*a* comes in contact with the tip (the upper end face) of the projection 14*b* and is welded thereto.

Figure 21:
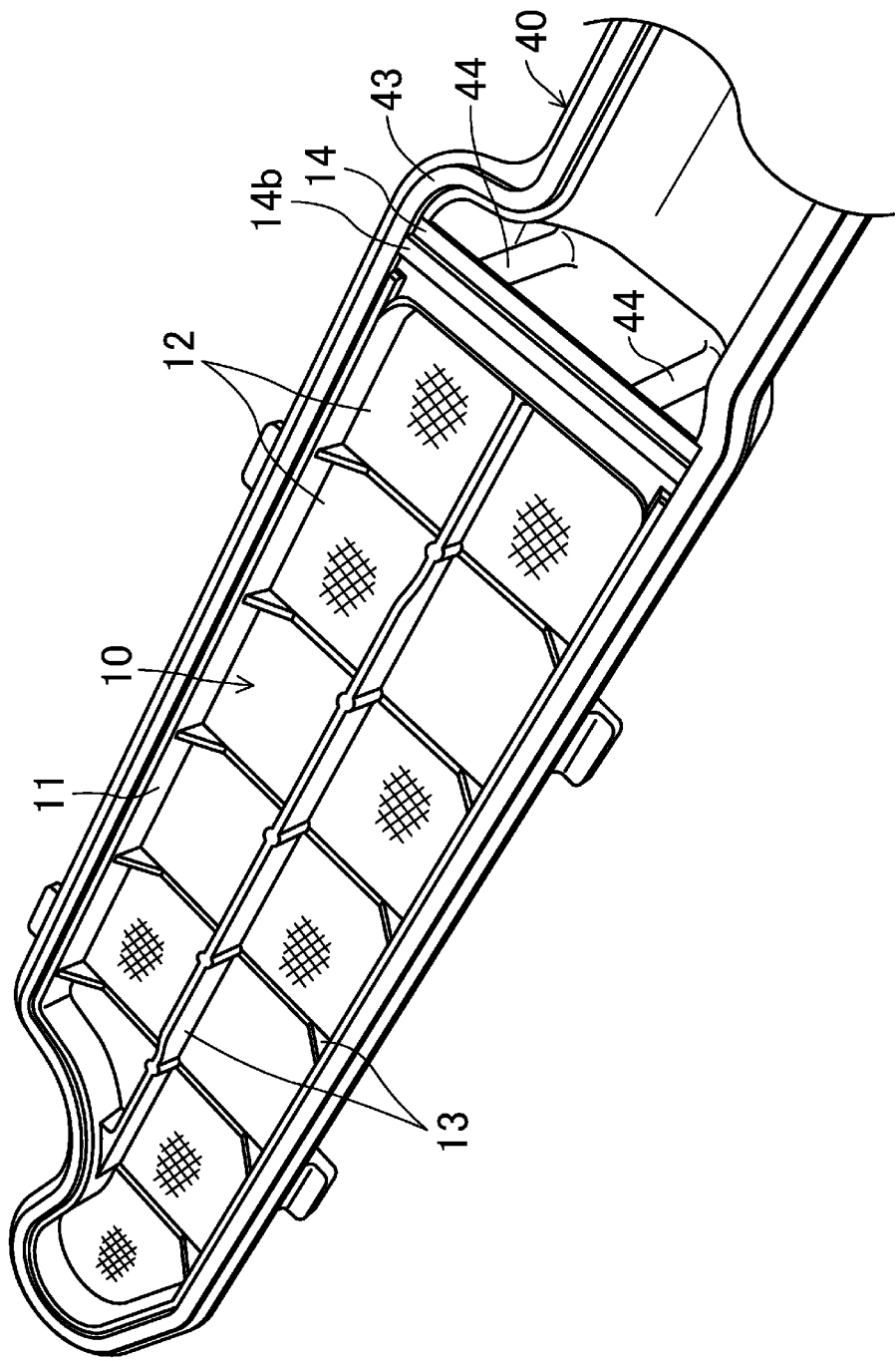
FIG. 21 is an enlargement perspective view illustrating a state in which a filter is fitted in a lower member of the fourth embodiment when viewed from above.

A procedure for fabricating the thus-configured oil strainer 1 will be described. First, the filter 10 is mounted to the lower member 40. Specifically, as illustrated in FIG. 21, the frame 11 of the filter 10 is fitted in the fitting recess 45 of the lower member 40. In this state, the tips of the projections 44 and 44 of the lower member 40 are brought into contact with the lower contact surface 14*a* of the intervening plate portion 14 of the filter 10 so that the intervening plate portion 14 is supported by the projections 44 and 44.

Thereafter, in the case of welding the upper member 30 and the lower member 40 together by using, for example, hot plate welding, one or both of the upper welding projection 33 and the lower welding projection 43 are melted with heat, and then, the open end of the upper member 30 and the open end of the lower member 40 are brought together such that the upper welding projection 33 and the lower welding projection 43 adjoin each other. In the case of using vibration welding, the open end of the upper member 30 and the open end of the lower member 40 are brought together such that the upper welding projection 33 and the lower welding projection 43 adjoin each other, and one of the upper member 30 or the lower member 40 is vibrated with respect to the other.

Concurrently with welding of the upper welding projection 33 and the lower welding projection 43, the projection 14*b* of the intervening plate portion 14 of the filter 10 and the contact portion 34*a* of the upper member 30 are brought into contact with each other and welded together. At this time, the tips of the projections 44 and 44 of the lower member 40 are brought into contact with the lower contact surface 14*a* of the intervening plate portion 14 so that the intervening plate portion 14 is supported flow below. This process ensures that the intervening plate portion 14 of the filter 10 is in contact with, and welded to, the contact portion 34*a* of the upper member 30, and this contact state can be maintained for a long period.

It is more preferable to melt and bond both of the upper welding projection 33 and the lower welding projection 43 together by heat. In this case, the welding strength can be increased and become stable.

Oil filtration by the oil strainer 1 will now be described. When an engine provided with the oil strainer 1 is actuated, a suction force from the oil pump causes oil in the oil pan to be first distributed in a space Rb in an upstream space R2 through the oil inlet 21 in the casing 20. Since the space Rb constitutes an oil channel elongated along the longitudinal direction of the casing 20, oil flows smoothly toward one end in the longitudinal direction of the casing 20.

The oil that has flowed in the space Rb reaches a space Ra, changes its direction upward from the space Ra, and flows toward the filter 10. The two projections 44 and 44 disposed in the space Ra are spaced apart from each other along the lateral direction of the oil channel. Thus, oil is easily distributed. Oil is filtered while passing through the filter 10, and flows into the downstream space R1.

While oil is flowing from the upstream space R2 into the downstream space R1, since the intervening plate portion 14 of the filter 10 is supported from below by the projections 44 and 44 of the lower member 40 and is in contact with the contact portion 34*a* of the upper member 30, no clearance is formed between the intervening plate portion 14 and the contact portion 34*a*. Accordingly, unfiltered oil in the upstream space R2 does not flow into the downstream space R1 through a clearance between the intervening plate portion 14 and the contact portion 34*a*.

As described above, in the oil strainer 1 of this embodiment, in the case of disposing the filter 10 extending from one end to an intermediate portion of the casing 20 in the longitudinal direction, the contact portion 34*a* of the upper member 30 is in contact with the intervening plate portion 14 disposed at an end of the intermediate portion in the longitudinal direction of the casing 20 in the filter 10. On the other hand, the intervening plate portion 14 of the filter 10 is supported by the projections 44 and 44 of the lower member 40 from the side opposite to the contact portion 34*a*. Thus, the intervening plate portion 14 of the filter 10 can be pushed against the contact portion 34*a*. Since the contact portion 34*a* is continuous to the upper welding projection 33 of the upper member 30, no clearance is formed between the periphery of the filter 10 and the upper member 30. Thus, it is possible to avoid passage of unfiltered oil between the periphery of the filter 10 and the upper member 30, thereby preventing a filtration failure.

In addition, the multiple projections 44 and 44 support the intervening plate portion 14 of the filter 10, thereby ensuring prevention of formation of a clearance between the periphery of the filter 10 and the upper member 30. Further, since the projections 44 and 44 are spaced apart from each other along the lateral direction of the oil channel, an increase in distribution resistance of oil can be reduced.

Figure 23A:
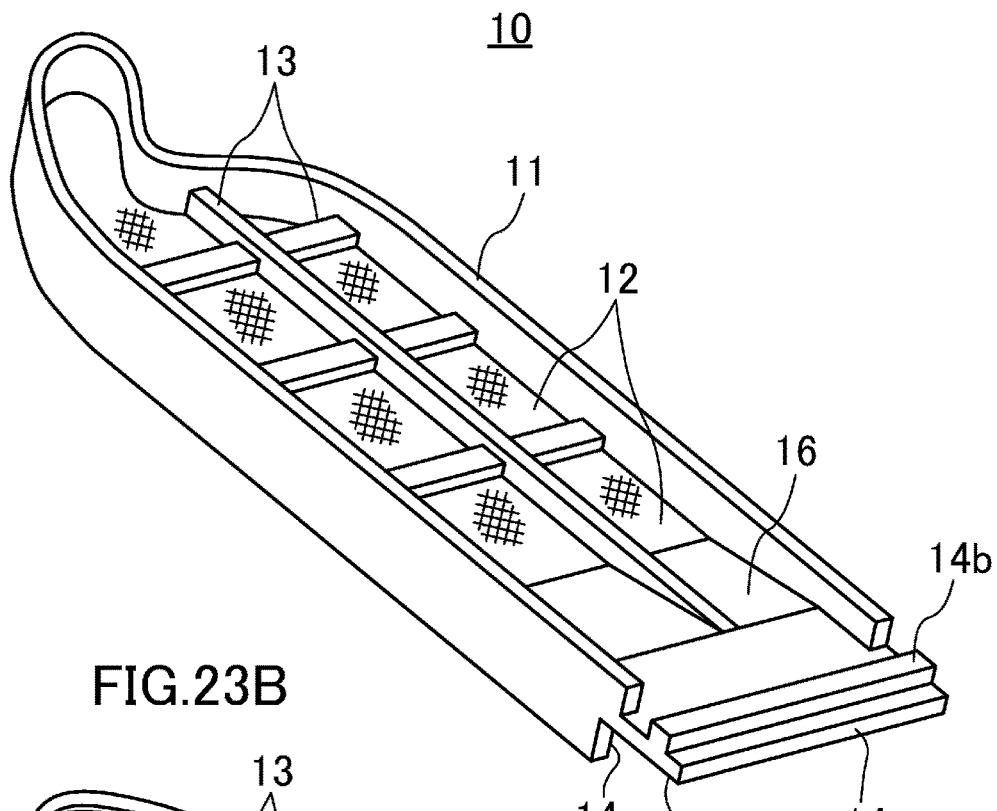
FIGS. 23A and 23B illustrate a first variation of the fourth embodiment.
Figure 23B:
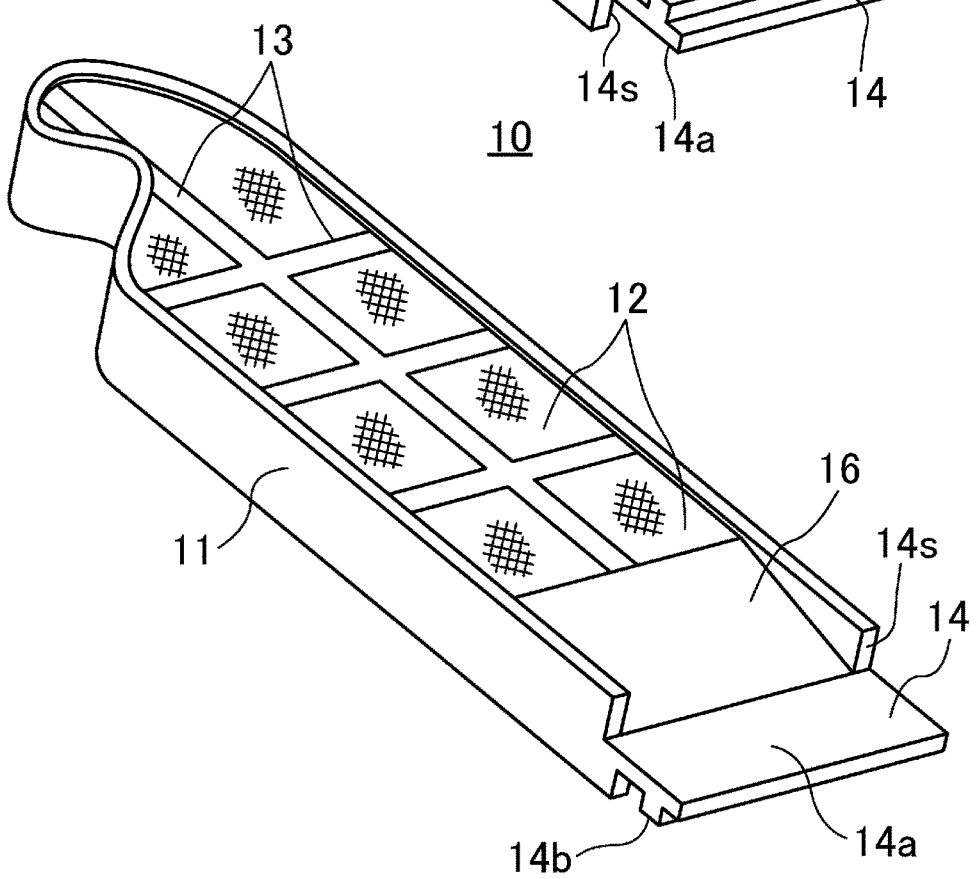

In a manner similar to that in the first variation illustrated in FIG. 23, an oil guide plate portion 16 may be provided between the mesh part 12 of the filter 10 and the intervening plate portion 14. The oil guide plate portion 16 declines from the intervening plate portion 14 toward the mesh part 12. Thus, the oil guide plate portion 16 causes oil to flow smoothly from the space Rb (see FIG. 20) of the upstream space R2 toward the space Ra while guiding the oil toward a downstream side of the filter 10.

In the above embodiment, the filter 10 is fitted in the fitting recess 45 formed in the lower member 40. However, the present invention is not limited to this configuration, and a fitting recess (not shown) may be formed in the upper member 30 so that the filter 10 can be housed in the upper member 30. In this case, projections 44 supporting the back surface of the projection 14*b* of the intervening plate portion 14 of the filter 10 extend downward from the inner surface of the upper member 30, and the lower ends of the projections 44 come into contact with the back surface of the projection 14*b* of the intervening plate portion 14. The oil inlet 21 is provided in the lower member 40 of the casing 20. A contact portion 34*a* facing upward is formed in the inner surface of the lower member 40 at a position corresponding to the projection 14*b* of the filter 10. In this case, in a manner similar to that in the embodiment, the intervening plate portion 14 of the filter 10 can be held between the contact portion 34*a* and the projections 44. This configuration ensures welding of the projection 14b of the intervening plate portion 14 of the filter 10 and the contact portion 34a.

The projections 44 may be formed so as to have an arch shape in a manner similar to that in the second variation of the third embodiment.

The projections 44 may be provided so as to be integrated with the lower contact surface 14a of the intervening plate portion 14 of the filter 10.

The lower contact surface 14a of the intervening plate portion 14 of the filter 10 may have a shape as those in the first embodiment and the first and second variations of the first embodiment. In such cases, a stepped stopper 45t may be formed on a fitting recess 45 formed in the lower member 40 such that the end surfaces of the intervening plate portion 14 can be fitted to the stopper 45t.

Figure 24A:
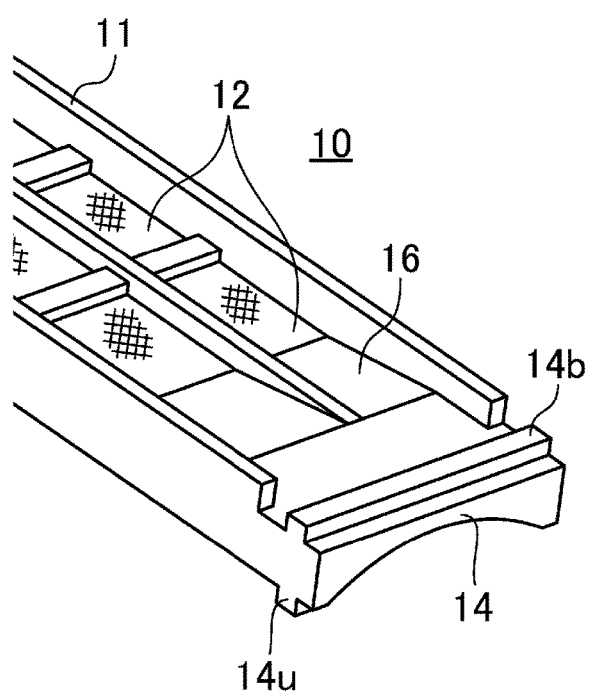
FIGS. 24A and 24B illustrate a second variation of the fourth embodiment.
Figure 24B:
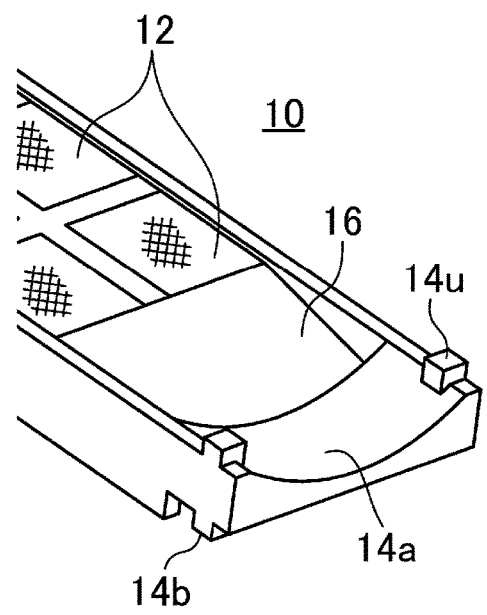
Figure 24C:
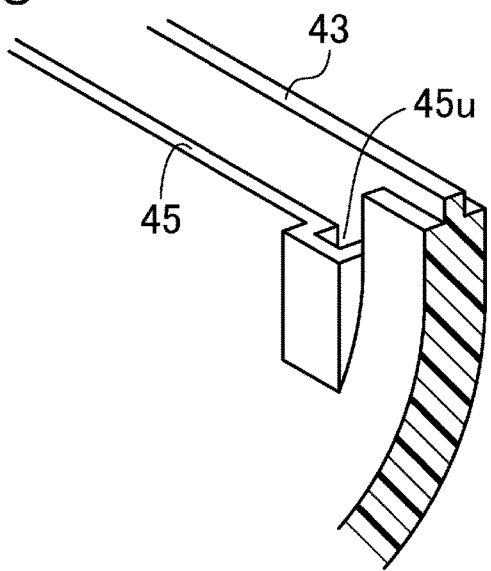
FIG. 24C is an enlarged view illustrating a portion of the lower member near a stopper.

In a manner similar to the second variation illustrated in FIG. 24, recessed engaging portions (recesses) 45u may be formed in the stepped stopper 45t such that an engaged portions (projections) 14u projecting from both end surfaces of the intervening plate portion 14 can be engaged with the engaging portion 45u. This configuration ensures prevention of positional displacement of the filter 10.

The shape of the casing 20 is preferably selected such that a middle portion in the lateral direction of the space Rb of the upstream space R2 is located between the projections 44 and 44. In this case, a main stream of oil flowing from the space Rb toward the space Ra passes between the projections 44 and 44. Thus, inhibition of an oil flow caused by formation of the projections 44 and 44 can be reduced.

The space Rb of the upstream space R2 may be disposed below the filter 10. This configuration enables oil flowing from the space Rb toward the space Ra to flow smoothly to a destination below the filter 10.

The cross-sectional shape of the space Rb of the upstream space R2 may be any one of a generally rectangular shape, a generally circular shape, or a generally ellipsoidal shape. For example, only a middle portion in the lateral direction of the upper wall of the upper member 30 is expanded upward so that the cross-sectional shape of the space Rb is enlarged upward.

The cross-sectional areas of the oil inlet 21 and the oil outlet 22 may be substantially the same.

The cross-sectional area of the downstream space R1 and the cross-sectional area of the space Ra of the upstream space R2 may be approximately the same, or the cross-sectional area of the downstream space R1 may be larger than that of the space Ra of the upstream space R2.

Each of the cross-sectional areas of the oil inlet 21, the downstream space R1, the space Ra of the upstream space R2, and the space Rb of the upstream space R2 may be approximately the same.

The filter 10 may be a metal mesh.

The cross-sectional areas of the downstream space R1, the space Ra of the upstream space R2, and the space Rb of the upstream space R2 may be larger than that of the oil inlet 21.

The oil strainer 1 may also be used for power units such as transmissions as well as engines.

The foregoing embodiments are merely examples in all the aspects, and should not be construed to limit the invention. All the modifications and changes within an equivalent scope of the claims fall within the scope of the invention.

INDUSTRIAL APPLICABILITY

As described above, an oil strainer according to the present invention can be used in an oil pan of an engine, for example.

DESCRIPTION OF REFERENCE CHARACTERS 1 oil strainer
10 filter
11 mesh part
12 frame
13 rib
14 intervening plate
20 casing
21 oil inlet
22 oil outlet
30 upper member
33 sealing portion
34 support
40 lower member
43 sealing portion
44 support
E engine block
R1 upstream space
R2 downstream space

The invention claimed is:
1. An oil strainer comprising:
a filter configured to filter oil; and
a cylindrical casing housing the filter and including an oil inlet and an oil outlet, wherein
oil that has flowed into the casing through the oil inlet is filtered while passing through the filter and flows out of the oil outlet,
the casing includes a first section and a second section that are separated from each other along a direction intersecting with a longitudinal direction of the casing,
the filter is positioned such that the filter is located upstream or downstream with regard to the oil flow direction of one of the first section and the second section in a way that at least one end of the filter is located at an intermediate position in the longitudinal direction of the casing,
the first section includes a contact portion that is in contact with and welded to an end of the filter corresponding to the intermediate position in the longitudinal direction of the casing and is continuous to an outer periphery of the first section,
a fitting part in which the filter is fitted is located on an outer periphery of the second section and at least at the intermediate position in the longitudinal direction of the casing, and
the second section includes a plurality of supports protruding from an interior face of the second section, and supporting the end of the filter corresponding to the intermediate position in the longitudinal direction of the casing from a side opposite to the contact portion, the supports being spaced apart from one another along a lateral direction of an oil channel,
a sealing portion is formed at projecting tips of the supports, the sealing portion extending in the lateral direction of the oil channel and coupling the plurality of supports,
the first section includes a partition wall extending in the lateral direction of the oil channel, the partition wall being provided with a first welding projection extending in the lateral direction of the oil channel, and
the sealing portion is provided with a second welding projection welded to the first welding projection formed on the partition wall of the first section so as to extend in the lateral direction of the oil channel.

2. The oil strainer of claim 1, wherein the first and second welding projections sandwich a frame of the filter.

3. The oil strainer of claim 1, wherein at least one of the supports is configured to support the filter.

\* \* \* \* \*